US008224623B2

(12) United States Patent
Handel et al.

(10) Patent No.: US 8,224,623 B2
(45) Date of Patent: Jul. 17, 2012

(54) METHOD TO DETERMINE A QUALITY ACCEPTANCE CRITERION USING FORCE SIGNATURES

(75) Inventors: Jeffrey M. Handel, Warren, OH (US); Robert W. Caven, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 281 days.

(21) Appl. No.: 12/757,119

(22) Filed: Apr. 9, 2010

(65) Prior Publication Data

US 2011/0251811 A1 Oct. 13, 2011

(51) Int. Cl.
*G06F 17/18* (2006.01)
(52) U.S. Cl. ........................................................ 702/179
(58) Field of Classification Search .................... 702/41, 702/179, 181, 193
See application file for complete search history.

(56) References Cited

U.S. PATENT DOCUMENTS

| | | | | |
|---|---|---|---|---|
| 4,855,923 | A | 8/1989 | Fullmer | |
| 6,301,777 | B1 | 10/2001 | Sigler et al. | |
| 2008/0099962 | A1 | 5/2008 | Sarabi et al. | |
| 2008/0101435 | A1* | 5/2008 | Chandler et al. | 374/120 |
| 2008/0226153 | A1 | 9/2008 | Ono et al. | |
| 2010/0307212 | A1* | 12/2010 | Handel et al. | 72/21.4 |

OTHER PUBLICATIONS

International Search Report dated Jun. 6, 2011.
Kai, Yang, et al., Multivariate statistical methods in quality management; ISBN 0-07-143208-6, 2004, pp. 216-222.

* cited by examiner

*Primary Examiner* — Michael Nghiem
*Assistant Examiner* — Manuel Rivera Vargas
(74) *Attorney, Agent, or Firm* — Paul W. Thiede

(57) ABSTRACT

A method is provided to determine a quality acceptance criterion using force signatures measured on a first and a second set of elements. The first set has no quality defect and the second set has a deliberate quality defect. Selection of an initial subset of time points is based on statistical analysis of the force data on the force signatures in the two sets. The quality acceptance criterion includes a quality threshold established using Mahalanobis Distance (MD) values and the MD values are produced from force data at a selected initial subset of time points for each element in the two sets. An output of the determined quality acceptance criterion is using the defined quality threshold to separate an element having a force signature into a group of elements having no quality defect or into a group of elements having a quality defect like the deliberate quality defect.

22 Claims, 10 Drawing Sheets

METHOD TO DETERMINE A QUALITY ACCEPTANCE CRITERION USING FORCE SIGNATURES

RELATED APPLICATION

This application is related to co-pending U.S. patent application Ser. No. 12/477,237, filed on Jun. 3, 2009 entitled "APPARATUS AND METHODS THAT APPLY A PRESS FORCE INCLUDING A SEPARATELY APPLIED CORE CRIMP FORCE," owned by the common assignee of the present invention, the disclosure of which is hereby incorporated herein by reference in its entirety.

TECHNICAL FIELD

This invention relates to a method to determine a quality acceptance criterion on force signatures of elements, more particularly, a quality threshold defined from a selected subset of time points along the force signatures of elements in two sets of elements and is used to separate an element having a force signature into a group of elements having no quality defect or a group of elements having a quality defect.

BACKGROUND

It is known to apply a force to a wire conductor and a terminal to crimp the wire conductor to the terminal. The force needed to produce the crimp portion, or core crimp portion element, is a core crimp force. The applied core crimp force producing the core crimp portion element has a core crimp force signature.

It is desirable to render a consistent, reliable quality decision on the quality of the core crimp portion element after application of the core crimp force during the crimping cycle. Smaller gauge wire conductor of less than 18 AWG includes a plurality of wire strands in an inner electrical conductor portion of the wire conductor that has a decreased cross section area as compared to similar plurality of wire strands contained in an inner electrical conductor portion of larger gauge wire conductor. The decreased cross section area in the inner electrical conductor portion in wire conductor of less than 18 AWG makes detecting a quality defect of a missing strand of wire in the core crimp portion increasingly difficult. A missing strand of wire in the plurality of wire strands in the inner electrical conductor portion may be caused by one or more of the plurality of wire strands being cut away during a wire stripping operation of the wire conductor to expose the inner electrical conductor portion in preparation to produce the core crimp portion element connecting the electrical conductor portion to the terminal. A missing strand of wire in the inner conductor core may also result if a quality defect is inherent in the electrical conductor portion of the wire conductor. An undetected core crimp portion element having a quality defect of at least one missing wire strand missing from the plurality of wire strands may produce undesired adverse downstream quality issues when the core crimp portion element connecting the wire conductor to the terminal is manufactured into a wiring harness assembly that is subsequently used in a product application.

Therefore, what is needed is an improved quality assessment of the core crimp portion element to detect quality defects and increase the probability that defective core crimp portion elements are not manufactured in downstream product applications using the core crimp portion elements. Detecting quality defects in the core crimp portion element is especially desirable for a terminal being crimped to a size of wire conductor being less than 18 AWG.

SUMMARY OF THE INVENTION

Analysis of an applied core crimp force signature that produces a reliable core crimp portion connecting the wire conductor to the terminal is found to be a suitable quality indicator for detecting the quality defect of a missing wire conductor strand contained in the core crimp portion element, especially for smaller gauge wire conductor having a size of less than 18 AWG connected to a corresponding terminal. Because the applied core crimp force signature is a suitable quality indicator of a core crimp portion element having a quality defect versus a core crimp portion having no quality defect, it is desirable to analyze the quality of the core crimp force signature. Analysis of the applied core crimp force signature producing the core crimp portion element also includes accounting for normal process variation in the construction of the core crimp portion element which may have a quality defect and a core crimp portion element which may have no quality defect. This is critical to reliably and consistently make a quality decision on a core crimp portion element.

In accordance with one aspect of the invention, a method of determining a quality acceptance criterion for a force signature produced on an element is provided. Force signatures are obtained from a first and a second set of elements. The first set of elements has no quality defect and the second set of elements has a deliberate quality defect. The force data in the two sets of elements are statistically analyzed to select an initial subset of time points from a plurality of time points in a time range along the force signatures, or force signature curves. A single Mahalanobis Distance (MD) value is produced for each element in the two sets with an input to a Mahalanobis Distance (MD) algorithm being force data from the force signatures at the selected initial subset of time points. An initial quality threshold is defined by evaluating the spread of the MD values corresponding to the two sets of elements. An output of determining the quality acceptance criterion is using the defined initial quality threshold to separate an element having a force signature into a group of elements having no quality defect or into a group of elements having a quality defect like the deliberate quality defect.

In accordance with another aspect of the invention, a manufacturing process method for connecting a wire conductor to a terminal is provided that uses a determined quality acceptance criterion for core crimp portion elements to render a quality decision on a newly manufactured core crimp portion element having a force signature. The rendered quality decision is either acceptable quality where the core crimp portion element has no missing wire strands from the plurality of wire strands in the core crimp portion element or is a quality defect where the core crimp portion element has at least one missing wire strand from the plurality of wire strands in the core crimp portion element.

In accordance with yet another aspect of the invention, a media including computer-readable instructions for determining a quality acceptance criterion for a force signature produced on an element is provided. An output of the determined quality acceptance criterion is using the defined quality threshold defined using a selected initial subset of time points to separate an element having a force signature into a group of elements having no quality defect or a group of elements having a quality defect like the deliberate quality defect.

BRIEF DESCRIPTION OF THE DRAWINGS

This invention will be further described with reference to the accompanying drawings in which.

DETAILED DESCRIPTION

Figure 1:
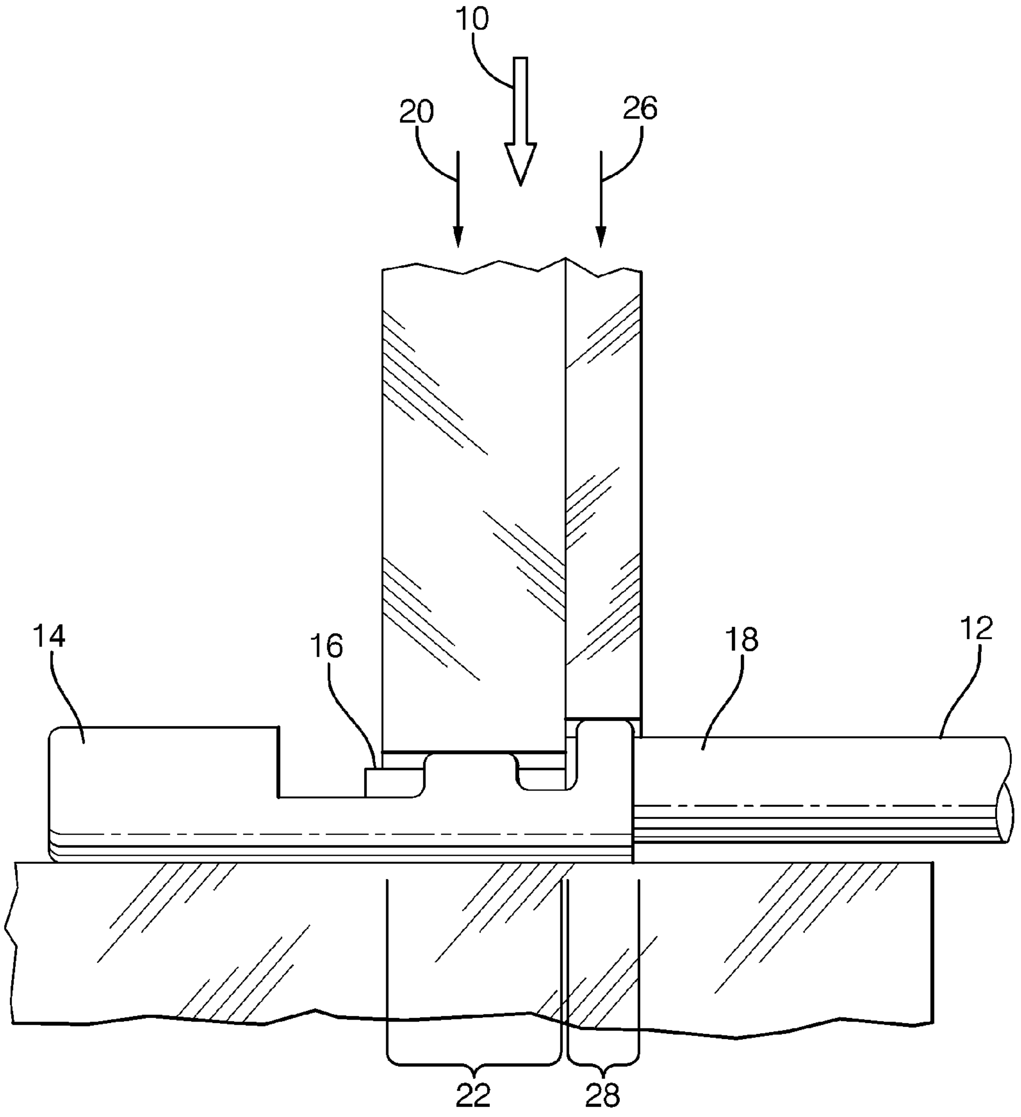
FIG. 1 is a perspective view of a press force being applied as a core crimp force to produce a core crimp portion element having a core crimp force signature, and the core crimp portion element connects the wire conductor to the terminal.

In accordance with an exemplary embodiment of this invention, referring to FIG. 1, a press force 10 is applied to a wire conductor 12 disposed in a terminal 14 to crimp conductor 12 to terminal 14. Wire conductor 12 includes an electrical conductor portion 16 and an insulated wire portion 18 surrounding electrical conductor portion 16. A portion of press force 10 is applied as a core crimp force 20 to electrical conductor portion 16 of wire conductor 12 disposed in terminal 14 to produce a core crimp portion element 22 after core crimp force 20 is applied. A portion of the applied press force 10 is also applied as an insulation crimp force 26 to insulated wire portion 18 of wire conductor 12 disposed in terminal 14 to produce an insulation crimp portion element 28. As illustrated in FIG. 1, core crimp force 20 and insulation crimp force 26 are applied respectively to electrical conductor portion 16 and insulated wire portion 18 disposed in terminal 14 just before core crimp portion element 22 and insulation crimp portion element 28 are fabricated. The wire conductor is preferably crimped with the terminal having a size that matches the size of the wire conductor. The wire conductor preferably has a size being smaller than 18 AWG. The metric equivalent for 18 AWG is 0.8 $mm^2$. The acronym AWG stands for American Wire Gauge and is a means of specifying wire gauge size.

Figure 2:
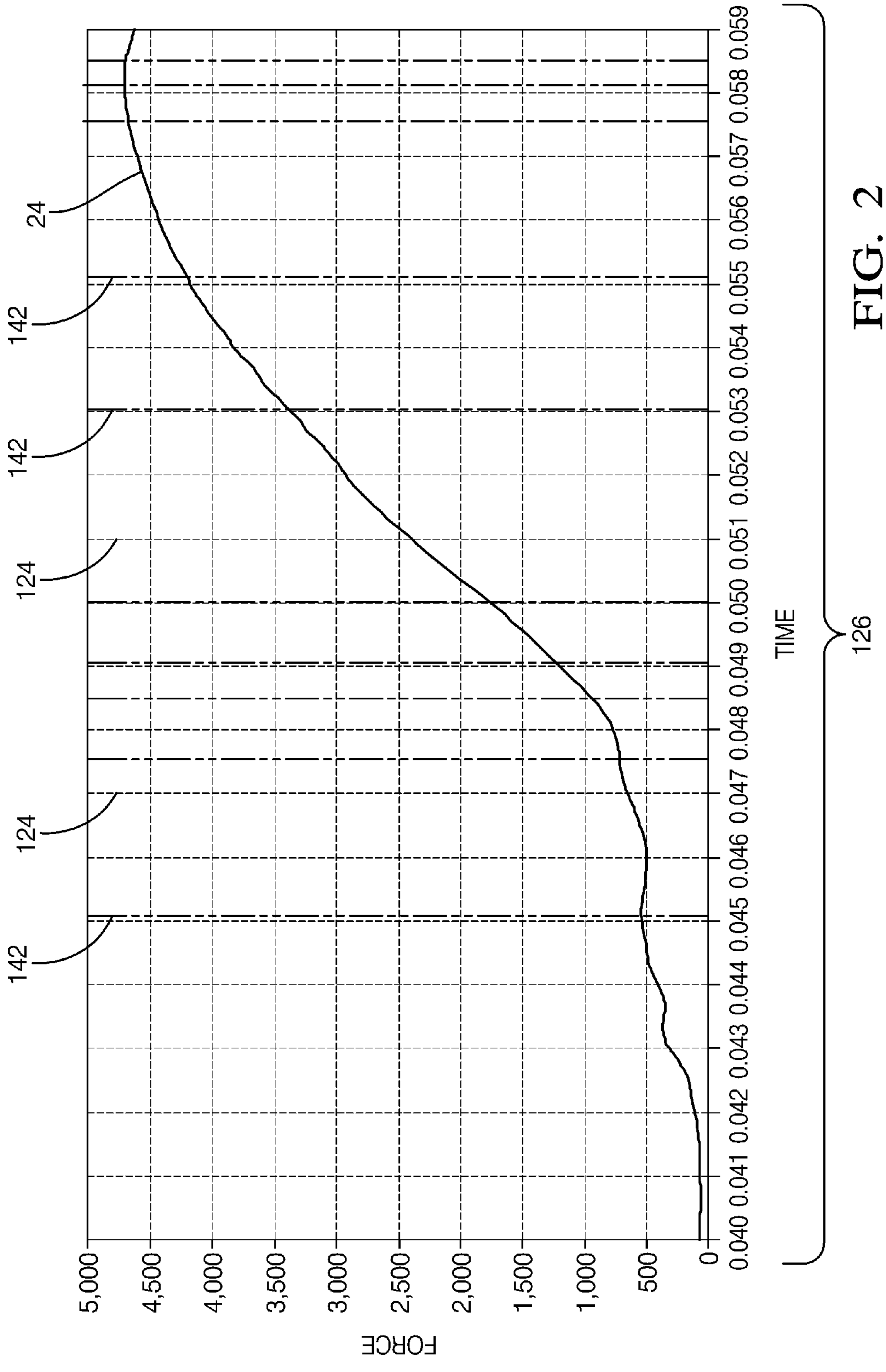
FIG. 2 is a view of a graph of a single core crimp force signature applied by the core crimp force to produce the core crimp portion element of FIG. 1.

Referring to FIGS. 1 and 2, core crimp force 20 producing core crimp portion element 22 has a corresponding core crimp force signature curve, or core crimp force signature 24. Core crimp force signature 24, as shown in FIG. 2, illustrates a portion of the core crimp force signature that is increasing in force. One skilled in the art would recognize that a complementary portion of the core crimp force signature curve also includes a portion of the core crimp force signature curve that is decreasing in force (not shown) that follows the increasing force portion thereafter. Electrical conductor portion 16 may be formed of braided wire (not shown). The braided wire is formed from a plurality of individual wire strands (not shown). The core crimp portion element 22 may have acceptable quality when all of the wire strands in the plurality of wire strands are contained within core crimp portion element 22. Core crimp portion element 22 may have a quality defect when at least one missing strand of wire from the plurality of wire strands is missing within core crimp portion element 22. While the wire conductor and terminal shown in FIG. 1 illustrate a single core crimp portion element and a single insulation crimp portion, it should be understood that the present invention may be applied to different wire conductor/terminal elements that may contain multiple core crimp portion elements and/or multiple insulation crimp portion elements dependent on factors such as wire conductor size and terminal construction.

As the applied core crimp force signature curve is a suitable quality indicator of acceptable quality or quality defects within the core crimp portion element, it is desirable to analyze the core crimp force signature curve that produces the core crimp portion element.

Figure 3:
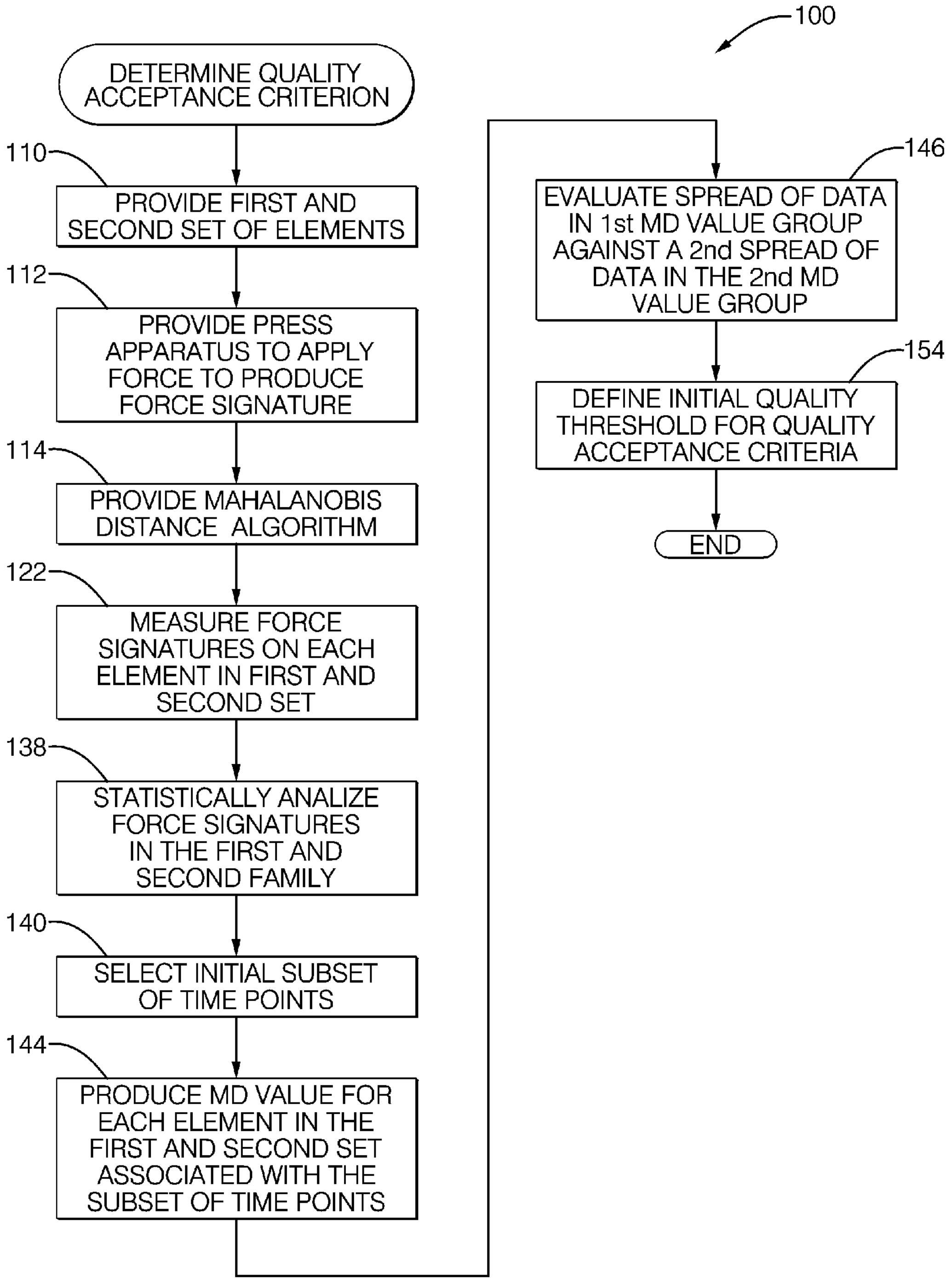
FIG. 3 is a flow chart showing method steps to determine a quality acceptance criterion from a first and a second set of core crimp portion elements with each element in the two sets having a force signature similar to the core crimp force signature of FIG. 2 in accordance with the present invention.
Figure 5:
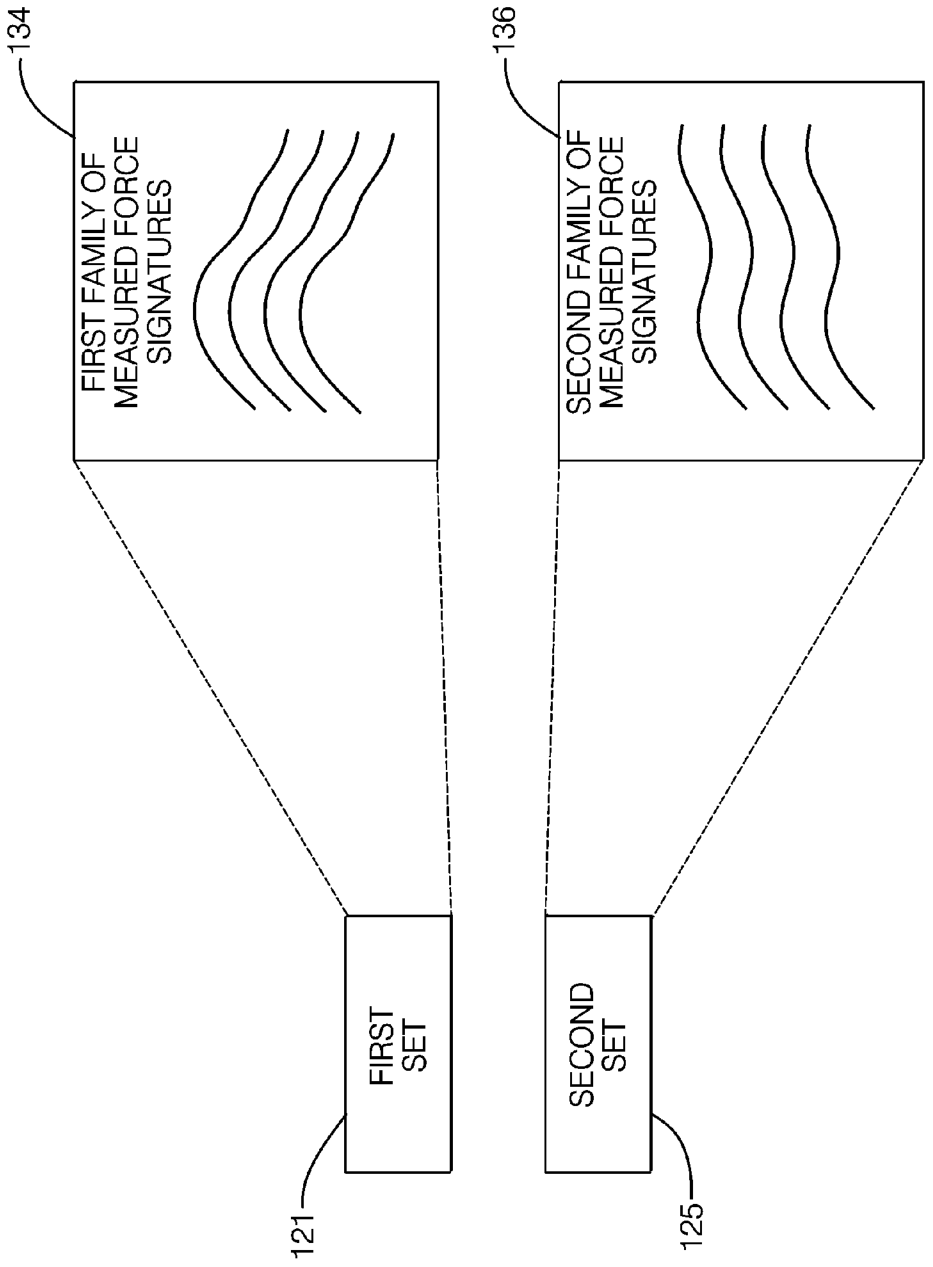
FIG. 5 is a topical view of the first and the second set of core crimp portion elements, and details thereof, according to the method of FIG. 3.

Referring to FIGS. 3 and 5, a flow diagram for determining a quality acceptance criterion 100 for a force signature produced on an element is presented. One step 110 in method 100 is providing a first set of core crimp portion elements 121 and a second set of core crimp portion elements 125. First set of core crimp portion elements 121 have no quality defect and second set of core crimp portion elements 125 have a deliberate quality defect. The composition of every core crimp portion element in the first and second set have similar features such as the same size of wire conductor and type of electrical wire portion being crimped to the same type of terminal with the same type of core crimp portion element being formed at generally the same location between the electrical conductor portion disposed in the terminal. First set 121 has the same number of elements as second set 125. First set 121 contains at least fifteen elements and second set 125 contains at least fifteen elements. Preferably, sets 121, 125 contain fifteen elements. First set of elements 121 are checked by the user of the method, such as an engineer or statistician, to have no quality defect in each core crimp portion element 22. The user of the method ensures first set of elements 121 have no missing stands of wire from the plurality of wire strands (not shown) from electrical conductor portion 16. In contrast, second set of elements 125 have a deliberate quality defect that is applied and checked by the user of the method to ensure each element in second set 125 is defective. Each element in second set 125 has at least one missing strand from the plurality of wires stands (not shown) in electrical conductor portion 16. The quality of each electrical conductor portion 16 in each of the two sets 121, 125 may be checked by inspection before fabrication of each core crimp portion element 22. For example, a deliberate quality defect applied to each element in second set 125 may be made by clipping away one wire strand in the plurality of wire strands in electrical conductor portion 16 for each wire conductor in second set 125.

Figure 4:
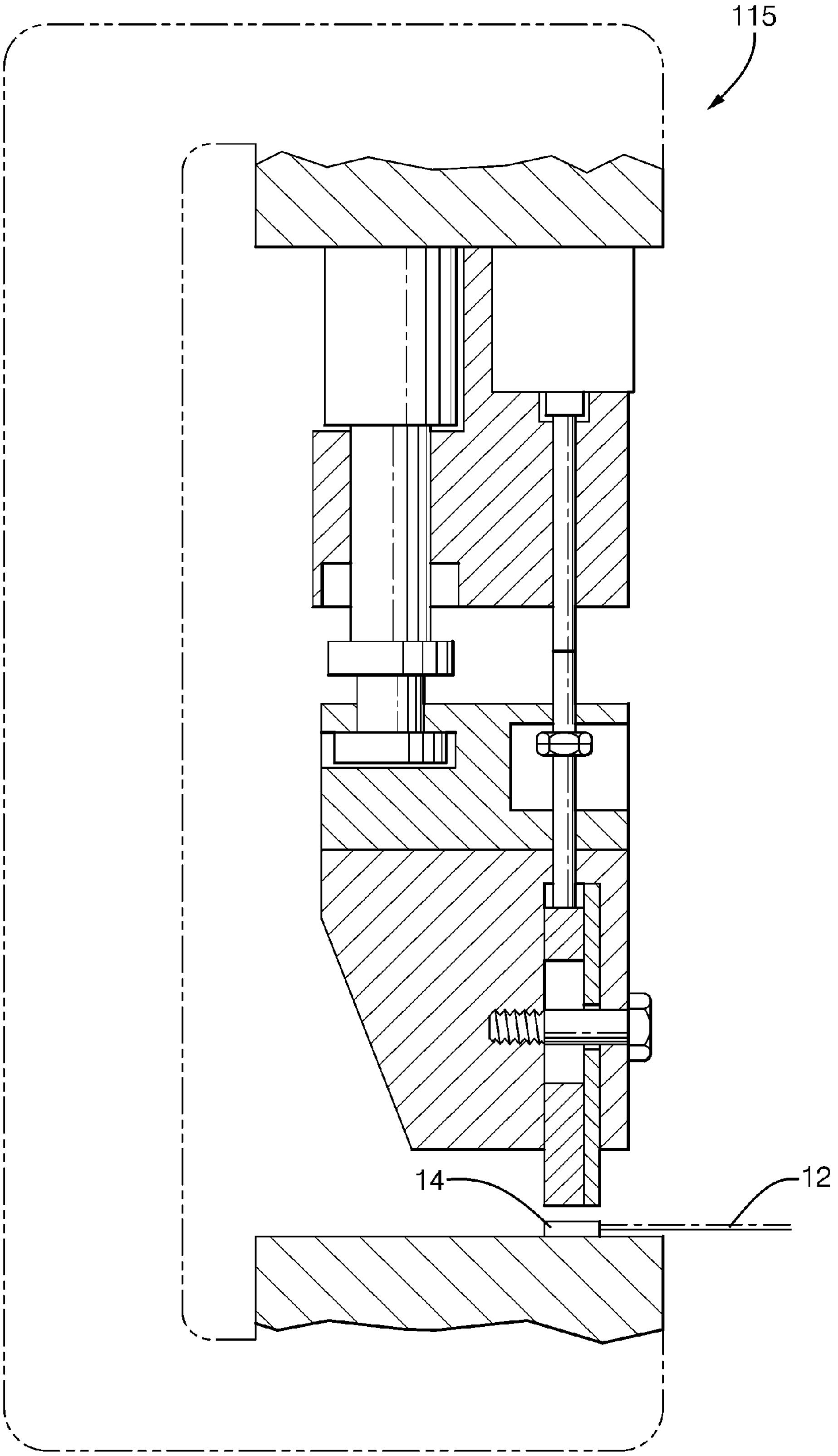
FIG. 4 is a cross section view of a press apparatus that produces a press force that is applied separately as a core crimp force of FIG. 1 producing the core crimp portion element having a core crimp force signature of FIG. 2, and as illustrated, the press force is not being applied.

Referring to FIGS. 1-4, another step 112 in method 100 is providing a press apparatus 115 configured to generate press force 10 to be applied to each core crimp portion element 22 in each of the two sets 121, 125. A portion of press force 10 is separately applied as core crimp force 20 to produce core crimp force signature 24 for each core crimp portion element 22 in each of the two sets 121, 125. One such press apparatus useful for this purpose is described in co-pending U.S. patent application Ser. No. 12/477,237, filed on Jun. 3, 2009, and incorporated by reference herein. As illustrated in FIG. 4, press apparatus 115 from co-pending U.S. patent application Ser. No. 12/477,237 is shown with press force 10 not being applied to electrical conductor portion 16 of wire conductor 12 disposed in terminal 14.

Referring to FIG. 3, a further step 114 in method 100 is providing a Mahalanobis Distance (MD) covariance matrix algorithm in a memory (not shown) of a data processing device (not shown). The data processing device may be associated with the press apparatus. Alternately, the data processing device may be a separate data processing device separate and apart from the press apparatus. The data processing device is configured for statistical mathematical processing that includes being configured to use the MD covariance matrix algorithm and process MD algorithm-type statistical computations and may include a processor, data processor, or a microcontroller disposed in a computer, or similar like devices that have capability to perform statistical mathematical computations.

Referring to FIGS. 2-5, a further step 122 in method 100 is measuring the force signature 24 having force data for each core crimp portion element 22 in the first and the second set 121, 125 produced by press apparatus 115. Each force signature 24 is measured at a plurality of time points 124 over a time range 126 thereon. Measurement of a force signature 24 on each element in the two sets 121, 125 produces a respective first and a second family of force signatures 134, 136. Force signatures from elements in first set 121 produce first family of force signatures 134. Force signatures from elements in second set 125 produce second family of force signatures 136. Time range 126 is generally defined as the time period over which the force signature occurs to form the core crimp portion element. Preferably, the time range is along a portion of the force signature curve that is increasing in force, as illustrated in FIG. 2. The increasing portion of the force signature curve substantially forms the core crimp portion element. Plurality of time points 124 includes measurement at a constant time interval between each time point in the plurality of time points 124 over time range 126. The time interval between each time point across range 126 is typically a function of the operation of the press apparatus and software measuring the force signature curve that produces the core crimp portion element. The software measuring the core crimp force portion element typically measures the force data at a constant time interval. Alternately, measurement of the force signature may be made at non-constant time intervals within the time range. For example, one time range for a force signature curve producing a core crimp portion element may occur within 100 milliseconds with a constant time interval between each point in the plurality of points being about 0.5 milliseconds. Thus, fifteen core crimp portion elements are provided and configured for first set 121 and fifteen core crimp portions are provided and configured for the second set 125. Fifteen measured core crimp force signature curves are collected for first set 121 and fifteen measure core crimp force signature curves are collected for second set 125. The fifteen measured force signature curves from the core crimp portion elements in first set 121 forms a first family of measured force signature curves 134. The fifteen measured force signature curves from the core crimp portion elements in second set 125 forms a second family of measured force signature curves 136.

Referring to FIGS. 3 and 5, in yet a further step 138 in method 100 is statistically analyzing respective first and second family of force signatures 134, 136 to establish predetermined statistics (not shown) on the force data on the measured force signatures in respective first and the second families 134, 136 at each time point in plurality of time points 124 over time range 126.

Another step 140 in method 100 includes selecting an initial subset of time points 142 from plurality of time points 124 based on the step of statistically analyzing respective first and the second family of force signatures 134, 136. Selected initial subset of time points 142 are based on evaluation of the statistical force data by the user on the force signature curve for each element in the first and the second set 121, 125 at each time point in plurality of time points 124 over time range 126. Initial subset of time points 142 are selected to ensure that initial subset of time points 142 are sufficiently separated from each other to adequately represent the force signature over plurality of time points 124 in time range 126. Preferably, two successive time points in plurality of time points 124 are not chosen for representation in initial subset of time points 142. Two successive time points in the plurality of time points may have undesired data noise that may be incurred in the measurement of the force data being successively measured. Thus, the time points selected for the initial subset of time points need to be sufficiently spaced apart within plurality of time points 124 in the time range to avoid this possible undesired noise measurement. Initial subset of time points 142 are also effectively selected so as to provide the desired spread of the data for the MD value groups for an evaluating step 146 in method 100. The predetermined statistics are effective in the selection of initial subset of time points 142 because statistical analysis of the force data over plurality of time points 124 in time range 126 by one skilled in the statistical arts allows the characterization of the force data into distinct groups of data that facilitate the selection of initial subset of time points 142. Initial subset of time points 142 are picked, where, to one skilled in the statistical arts, the predetermined statistics indicate that there is separation between the force data of first group of force signatures 134 and the force data of second group of force signatures 136. Initial subset of time points 142 are also effectively selected to ensure that an initial optimization metric value (not shown) is realized to provide an optimization run 200 to define an optimal subset of time points.

Figure 6:
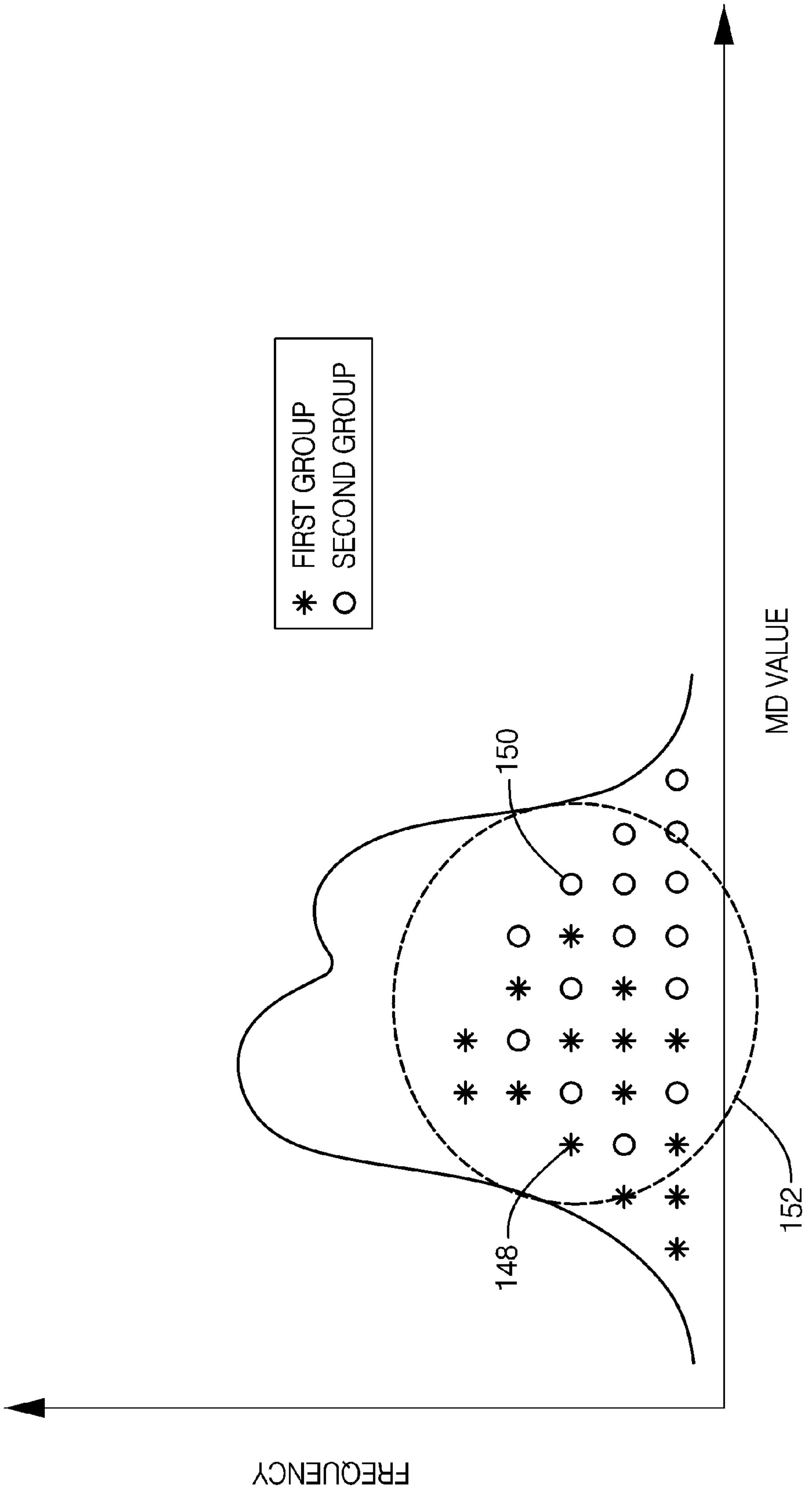
FIG. 6 is a view of a graph of the plotted MD values where the MD values are commingled together.

Referring to FIGS. 3 and 6, a further step 144 in method 100 includes producing a single Mahalanobis Distance (MD) value for each element in first and the second set 121, 125, respectively, with the MD algorithm (not shown). The force data associated with each element in first and second set 121, 125 at the selected initial subset of time points 142 is input to the MD algorithm. The MD values output from the MD algorithm produced for elements in first set 121 forms a first MD value group 148 and the MD values produced for elements in second set 125 forms a second MD value group 150. The MD algorithm uses a configured reference covariance matrix that is often used in the statistical process control industry. As is understood in the art, force data used to configure the MD algorithm is based on a reference group of known "good parts" or reliable core crimp portion elements having no quality defect and a reference group of known "defective parts" or core crimp portion elements having a deliberate quality defect. The MD algorithm is initially configured, or set-up by creating a reference MD covariance matrix using the initial subset of time points as the variables. The need to define variables for the MD algorithm is known in the statistical arts. The MD covariance matrix is then used to calculate the MD values in step 144 of method 100 for each core crimp portion element in the first set ("good part") and the second set ("defective part") on force data at the selected initial subset of time points.

Referring to FIGS. 3 and 6, a further step 146 in method 100 is evaluating a first spread of data of first MD value group 148 against a second spread of data of second MD value group 150 by the user of the method. First MD value group 148 and second MD value group 150 form an initial quality metric MD family group 152 having a corresponding initial optimization metric value (not shown). The optimization metric value is a measure of how much separation there is in the MD values between the first and the second MD value groups. For example, the optimization metric value may be a ratio value of the difference in averages of the MD values of the two MD value groups to the pooled standard deviations of the MD values of the two MD value groups. An increasing ratio value provides an indication that there is more discrimination, or separation between the two MD value groups. This allows for a determination of a quality threshold that clearly delineates the two MD value groups that has less risk of misclassifying core crimp portion elements based on their MD values. The initial optimization metric value provides a starting point to establish the optimization metric value using the initial quality MD value group. The invention is not limited to only this ratio approach in defining the optimization metric value, but may include any suitable approach that measures, or quantifies the separation of the MD values between the first and the second MD value group or quantifies the separation of the force data from the first family of force curves from the second family of force curves. For example, another approach to define the optimization metric value may be to define a ratio value of the difference in medians of the MD values of the two MD value groups to the pooled standard deviations of the MD values of the two MD value groups. Still yet alternately, the ranges of the two groups may be used instead of the standard deviations. Still yet alternately, Tukey's end count method may also provide relevant information on the separation between the two MD value groups.

In yet another step 154 of method 100 is defining an initial quality threshold to be the quality acceptance criterion using initial quality metric MD family group 152 at selected subset of time points 142. An output of determining the quality acceptance criterion is using the defined quality threshold to separate the element having said force signature into either a group of elements having no quality defect or a group of elements having a quality defect like the deliberate quality defect of the elements in second set 136.

Figure 8:
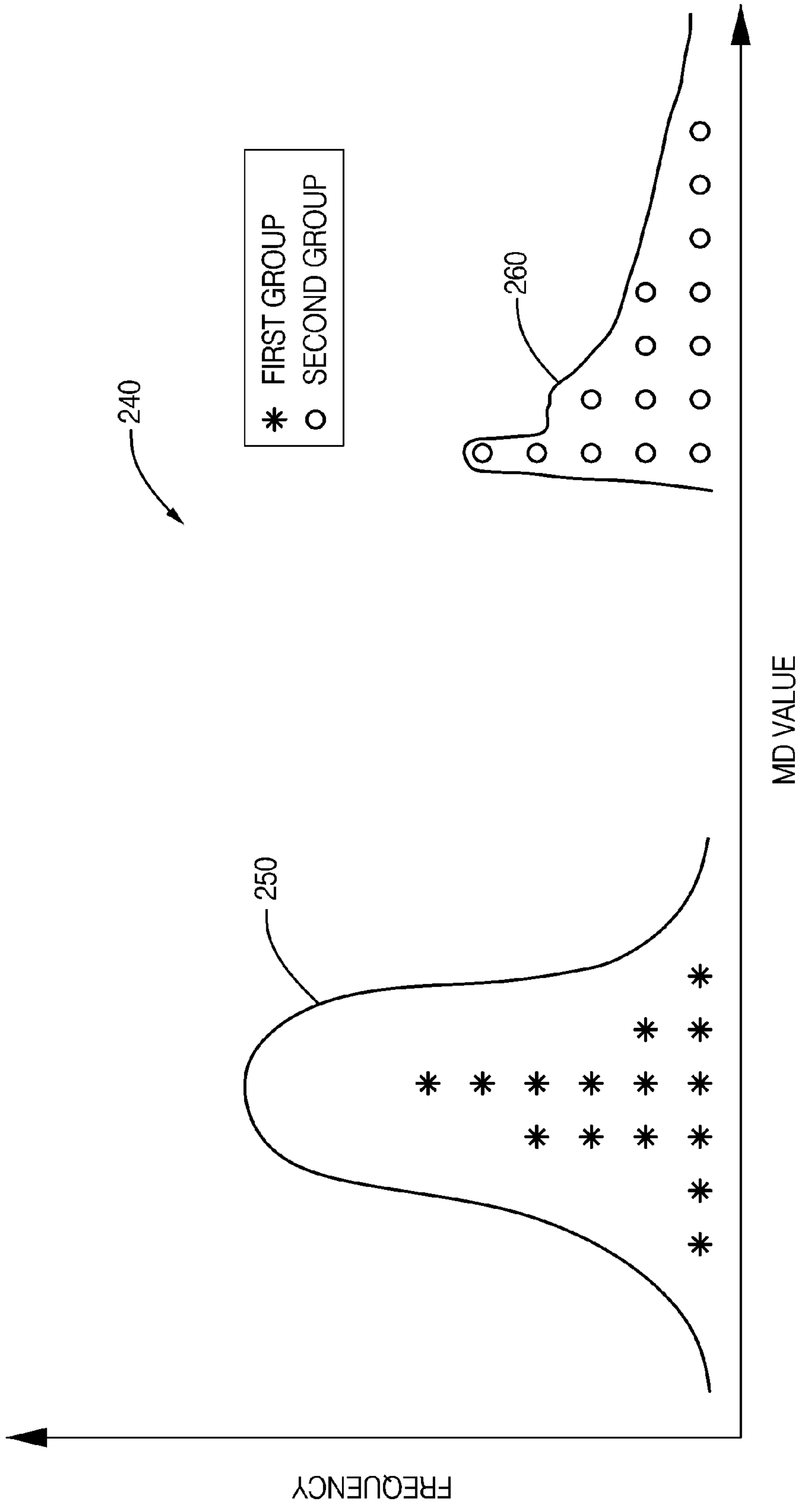
FIG. 8 is a view of a graph of the plotted MD values where the MD values of the second group are spread apart from the first group.

Referring to FIGS. 6 and 8, defining the initial quality metric is a function of a comparison of the spread of the force data in the first MD family group and the force data in the second MD family group versus the separation of the force data between the first MD family group and the second MD family group. The user evaluates the spread of the data of first MD value group 148 having no quality defect against second MD value group 150 having a deliberate quality defect as a starting point to define an initial quality threshold.

Referring to FIG. 6, the data of the first MD value group is graphed with the data of the second MD value group. The data of the first MD value group is commingled together 152 with the data of the second MD value group. Because the MD value group data is distributed together, it is difficult to determine if a MD value of a particular element belongs to first group 148 or second group 150. In contrast, referring to FIG. 8, it is desirable that the values of the MD value groups be separated in distinct clusters with clear separation between a first group 250 and a second group 260. The initial subset of time points allows the graphing of MD value groups 148, 150 that may produce the graph of FIG. 6 or the graph of FIG. 8, or another graphical depiction that is in-between the graphs of FIGS. 6 and 8.

If the selected subset of time points generates the commingled data 152 in FIG. 6, the first, or initial quality threshold may be chosen at some point, or location within the commingled MD value data of first group 148 and second group 150. MD value data that is the same or located to the left of a chosen initial quality threshold value in the commingled MD value data, will be assumed, or judged to be from first group 148. MD value data located to the right, or greater than the chosen initial quality threshold is assumed, or judged to come from second group 150.

Because the MD values in initial quality metric MD family group 152 that includes first and second group 148, 150 are generally not separated, regardless of the chosen quality threshold, it is possible for a core crimp portion element from second group 150 to have an MD value to the left of the chosen quality threshold and be judged to come from first group 148. It is also possible for a core crimp portion element from first group 148 to have an MD value to the right of the chosen quality threshold and therefore be judged to come from second group 150. Thus, there is a high probability of mischaracterizing an element based on its MD value with the graphed MD value scenario illustrated in FIG. 6. Picking a quality threshold value is a balance between the risk of judging an element to be in the first group when the element is actually in the second group and vice versa. If a quality threshold value is chosen to the left of the middle portion of cluster, the quality threshold value reflects more elements being disposed in second group 150 to the right of the chosen threshold. This judgment increases the likelihood of a false alarm or a Type 1 error as is known in the statistical art. With a Type 1 error, more elements may be judged to be in second group 150 where more acceptable quality elements are judged to be defective when they are not.

In contrast, if a quality threshold value is chosen to the right of the middle portion of cluster, the quality threshold value reflects more core crimp portion elements to be in first group 148 to the left of the chosen quality threshold. This is known as a miss, or false negative that is known as a Type 2 error in the statistical art. With a Type 2 error, more core crimp portion elements may be judged to be in first group 148 where more defective elements may be judged to be acceptable quality when they are not.

If the force signature data from the selected subset of time points provides a grouping of MD value data 240 as illustrated in FIG. 8, selecting an initial quality threshold is less complicated than for the graph of FIG. 6 due to the separation of the MD value data of first group 250 from the MD value data of second group 260. The MD value group of first group 250 is a distinct cluster and the MD value group of second group 260 is a distinct cluster. The cluster of first group 250 is separated from the cluster of second group 260. The curve on the left portion of the graph of FIG. 8 illustrates the MD values in first group 250 being in a distinct cluster with no MD values included from second group 260. The curve on the right portion of the graph of FIG. 8 illustrates the MD values in second group 260 being in a distinct cluster with no MD values from first group 250. A threshold may be chosen between the cluster of first group 250 and the cluster of second group 260 such that all MD values of first and second group 250, 260 are to the left and the right of the chosen quality threshold without misclassification of MD values being in the wrong group. Thus, a quality threshold chosen with the distinct cluster scenario of FIG. 8 has far less risk in classifying elements in the wrong MD value groups.

Preferably, sound engineering judgment may be used, as is known in the statistical art, in the selection of the initial quality threshold whether the MD value scenario is that of FIG. 6 or FIG. 8 or somewhere in-between the MD value scenarios of FIGS. 6 and 8. Especially with the MD value scenario of FIG. 6, sound engineering judgment is desired such that the quality threshold is chosen to sufficiently not misjudge core crimp portion elements to be in the wrong MD value group when they are not. Alternately, known best-fit statistical models may be used to evaluate the MD value groups to mathematically choose a quality threshold value that provides the best balance between Type 1 and Type 2 risks as previously described herein.

While method 100 may be employed for a plurality of wire sizes having an inner electrical conductor portion having a plurality of wire strands, method 100 is very desirable for a wire conductor having a size preferably smaller than 18 AWG being crimped to an associated terminal having a similar size. Even more preferably, method 100 may be employed for a plurality of wire conductor sizes of less than 22 AWG having an electrical conductor portion with a plurality of wire strands.

The initial quality threshold MD family group assists to define an initial quality threshold in method 100. It is desirable to define an optimal quality threshold at an optimal subset of time points that provides a quality acceptance criterion that may be better able to distinguish core crimp portion elements having no quality defect versus core crimp portion elements having a quality defect like the deliberate quality defect defined in second set of core crimp portion elements 125.

Figure 7:
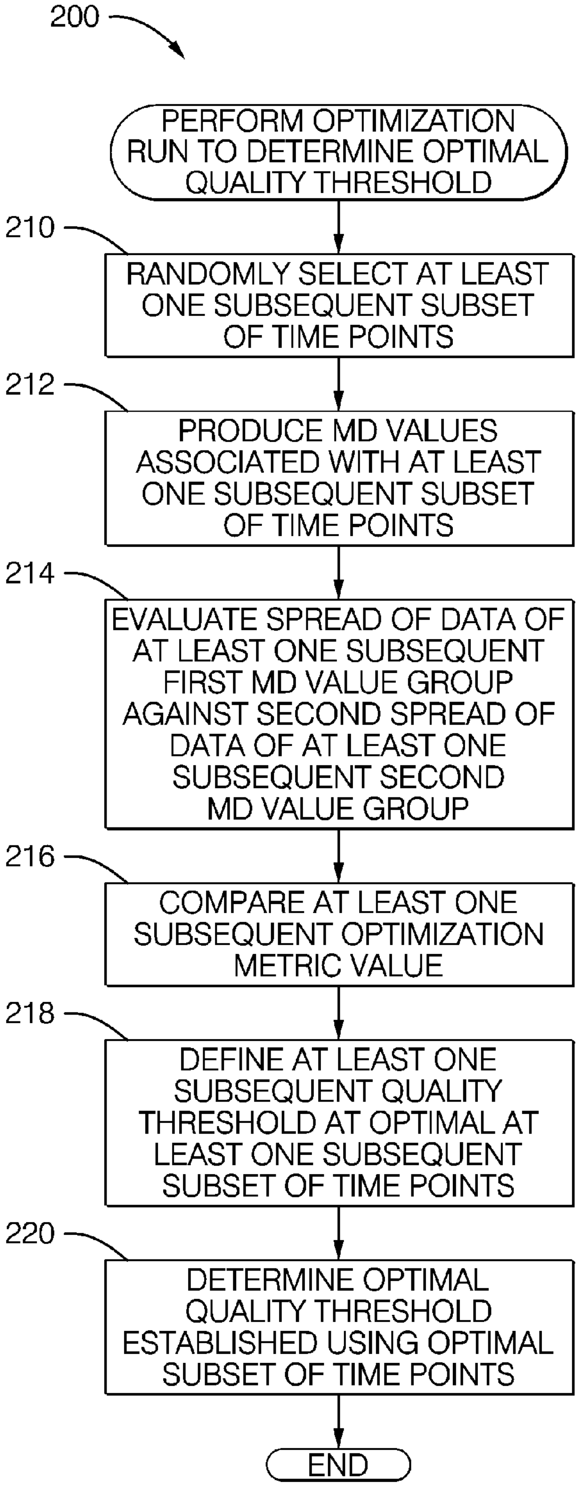
FIG. 7 is a flow chart showing the method substeps to perform an optimization run further defined from the method of FIG. 3 to determine the optimal quality threshold established using an optimal subset of time points.

Referring to FIGS. 2 and 7, a flow diagram to perform optimization run 200 is provided having substeps to determine the optimal quality threshold established using the optimal subset of time points. The purpose of the optimization run is to obtain an optimal subset of time points within a reasonable amount of time. An optimization metric value is a value that gets increasingly large with subsequent choice of time points until it eventually stops increasing. An optimal optimization metric value is considered to be a value that does not further increase. An optimal optimization metric value assures that the corresponding optimal quality threshold value may correctly discriminate an element belonging to the first set from an element belonging to the second set, with low risk of improperly classifying the element.

One substep 210 in flow diagram 200 is randomly selecting at least one subsequent subset of time points (not shown) from plurality of time points 124 over time range 126. The at least one subsequent subset of time points may be selected using known random number generator algorithms to randomly select time points in the time range with the data processing device. Alternately, heuristic number selection may be used in conjunction with random number generation. For example, simulated annealing as known in the art may be used to randomly generate the at least one subset of time points. The MD algorithm is configured, or set-up by creating a reference MD covariance matrix using the at least one subsequent subset of time points as the variables. This is necessary for each at least one subsequent subset of time points that is generated for the optimization run. The need to define variables for the MD algorithm is known in the statistical arts.

Another substep 212 in flow diagram 200 is producing a single Mahalanobis Distance (MD) value for each element in first and second set 121, 125, respectively. The force data associated with each element in first and the second set 121, 125 corresponding with the at least one subsequent subset of time points are input to the MD algorithm. The output of the MD algorithm produces MD values for elements in the first set forming an at least one subsequent first MD value group 250 and the MD values produced for elements in the second set forming an at least one subsequent second MD value group 260. The MD algorithm is used in a similar manner as in method 100, previously described herein, but is with force data associated with the at least one subsequent subset of time points. The reference MD covariance matrix used in the MD algorithm is set-up with the at least one subsequent subset of time points.

A further substep 214 in flow diagram 200 is evaluating the first spread of data of the at least one subsequent first MD value group against a second spread of data of the at least one subsequent second MD value group by the user. The at least one subsequent first and the second MD value group 250, 260 form an at least one subsequent quality metric MD family group 240 with a corresponding at least one subsequent optimization metric value. Evaluation of the value groups is similar to the discussion as applied to the graphs in FIGS. 6 and 8 as described in method 100 previously described herein. When an optimization run is performed, the spread of the data of the at least one subsequent MD value groups may often appear more like the graph illustrated in FIG. 8 than the graph illustrated in FIG. 6. However, it is possible for the at least one subsequent MD value groups to appear like the graph as illustrated in FIG. 6.

A further substep 216 in flow diagram 200 is comparing the at least one subsequent optimization metric value with the initial optimization metric value and any previous optimization metric values generated with the optimization run to determine an optimal optimization metric value to ensure that either the initial subset of time points or the at least one subsequent subset of time points are an optimal at least one subsequent subset of time points. It may be understood that "ensure" is meant in a practical sense to find an acceptable optimal at least one subsequent subset of time points in a reasonable amount of time. One skilled in the art of mathematical optimization would recognize that there may not be a way of finding an optimal at least one subsequent subset of time points if the total number of possible of at least one subsequent subset of time points that may be tried is very large. For example, one calculation indicates an amount of possible at least one subsequent subsets of time point to try is on the order of $10^{15}$ possibilities.

The optimization metric value may be determined by the ratio as previously described herein. Using the optimization run, an at least one subsequent subset of time points may be considered more optimal than other at least one subsequent subset of time points or the initial subset of time points if its at least one subsequent optimization metric value as represented by an increased ratio value as previously described herein, indicates a greater separation between the at least one subsequent MD value groups than previous at least one subsequent MD value groups using the at least one subsequent subset of time points obtained with the optimization run or increased separation over the MD value groups established at the subset of time points. Optimization run 200 may be utilized as needed until an optimal subset of time points corresponding with the optimal optimization metric value is established.

A further substep 218 in flow diagram 200 is defining at least one subsequent quality threshold using the at least one subsequent quality metric MD family group at said corresponding at least one subsequent subset of time points. The at least one subsequent quality threshold may be defined as described in method 100 as applied to FIGS. 6 and 8 previously described herein.

In yet a further step 220 in flow diagram 200 is determining the optimal quality threshold established using the optimal subset of time points corresponding with the optimal optimization metric value. The optimal quality threshold and the optimal subset of time points are either the initial quality threshold using the initial subset of time points or the at least one subsequent quality threshold using the at least one subsequent subset of time points. The choice for the optimal quality threshold established using the optimal subset of time points corresponding with the optimal optimization metric value is based on the spread of data of the MD groups and the MD groups may often be as illustrated as in FIG. 8.

Figure 9:
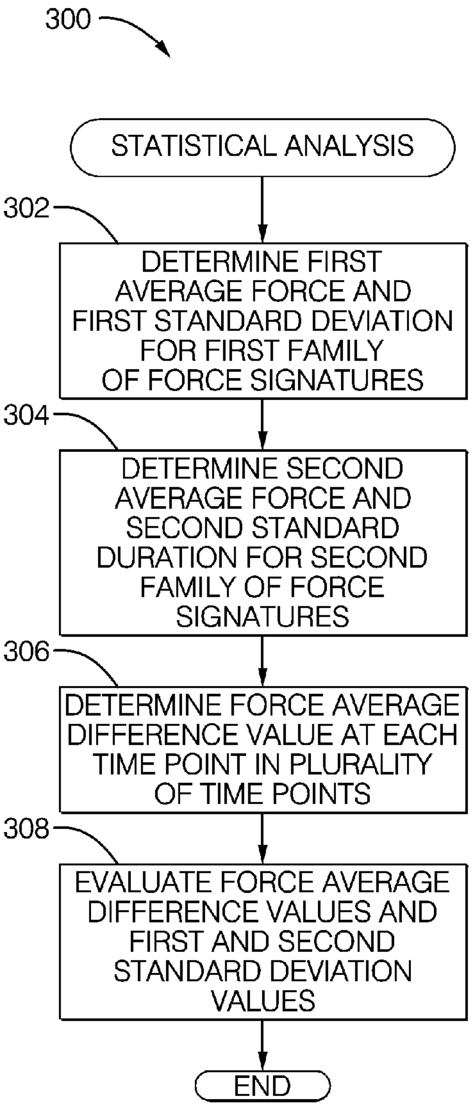
FIG. 9 is a flow chart showing the method substeps for the predetermined statistics for statistically analyzing the force data according to the method of FIG. 3.

Referring to FIG. 9, statistically analyzing using established predetermined statistics on the first and the second family of force signature curves is shown in the substeps included in flow diagram 300.

One substep 302 in flow diagram 300 is determining at each time point in the plurality of time points over the time range a first average force and a first standard deviation for the first family of force signature curves by the data processing device.

Another substep 304 in flow diagram 300 is determining at each time point in the time range a second average force and a second standard deviation for the second family of force signature curves by the data processing device.

A further substep 306 in flow diagram 300 is determining at each time point in the plurality of time points over the time range a force average difference value by the data processing device. The force average difference value is the difference between the first average force and the second average force at each time point in the plurality of time points over the time range.

A further substep 308 in flow diagram 300 evaluating by the user at least one of either (i) the force average difference value, (ii) the first standard deviation, and (iii) the second standard deviation for the respective first and second family of force signature curves at each time point in the plurality of time points over the time range.

Method 300 allows for a more apt, or judicious selection of initial subset of time points 142 based on the difference in averages and standard deviations of two sets of elements 121, 125 at each respective time point that will provide a ratio having a large value for the initial optimization metric value as described previously herein. Using the difference in averages and the standard deviations on the two sets of elements provides an understanding of how well the force signatures will be able to distinguish first set of elements 121 having no quality defect from the second set of elements 125 having the deliberate quality defect when the force data is converted into MD values. The largest difference in the force average difference value and/or standard deviation between the first family of force curves and the second family of force curves indicates a starting point for the selection of one of the time points in the initial subset of time points. The choice of other time points in the initial subset of time points may be based on looking at other successively smaller differences in the force average difference value. Each time point in the subset of time points needs to be sufficiently meaningfully spaced from other chosen time points to prevent data noise from negatively affecting the choice of the time point that would undesirably affect the definition of the initial quality threshold.

Figure 10:
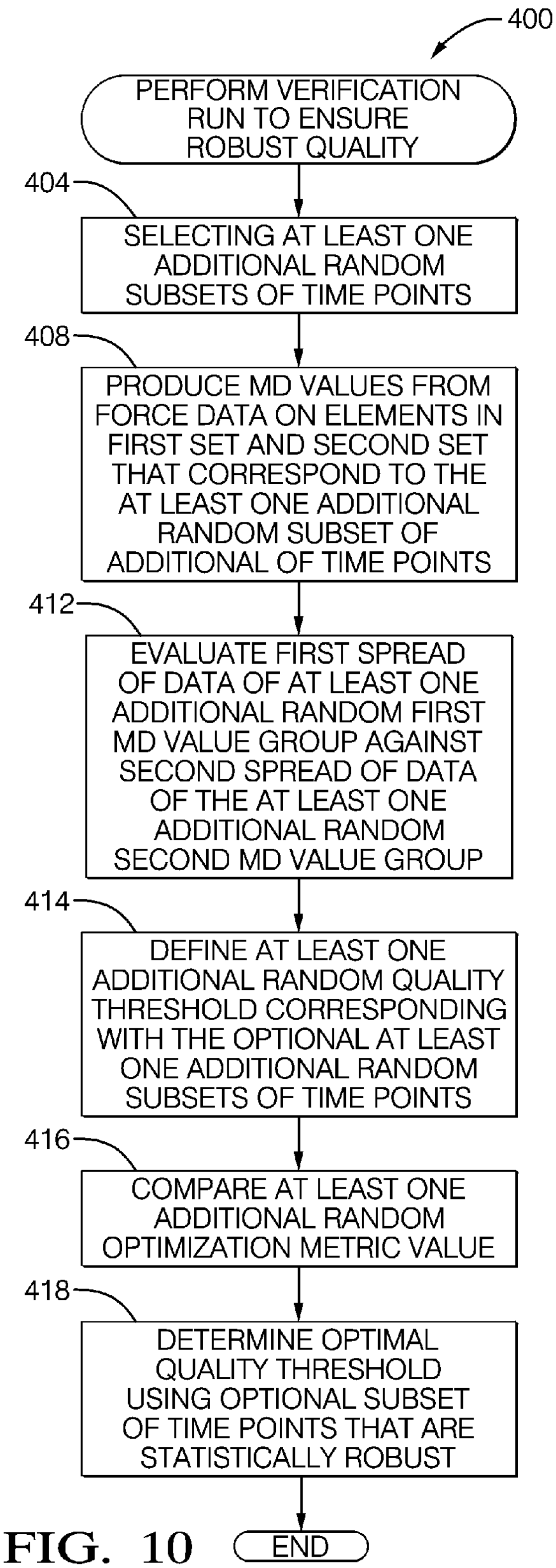
FIG. 10 is a flow chart showing the method substeps to perform a verification run to ensure robust quality of the optimal subset of time points further defined from the substeps of FIG. 7.

Referring to FIG. 10, a verification run 400 is utilized to ensure that the optimal quality threshold established using the optimal subset of time points has a quality that is statistically robust. The purpose of the verification run is to assure that the optimal subset of time points from the optimization run has an optimization metric value that does not change significantly if the respective optimal subset of time points deviates by a random incremental amount as produced by the verification run. Thus, the goal of the verification run is to select at least one additional random subset of time points close to the optimal subset of time points such that the at least one additional random subset of time points has an at least one additional optimization metric value similar to other at least one additional random subset of time points or the optimal optimization metric value. If the verification run determines that the optimal subset of time points are not robust, the optimization run may be re-run to define a new optimal quality threshold at a new optimal subset of time points, and the new optimal quality threshold at the new optimal subset of time points may be re-verified with a verification run.

One substep 404 in flow diagram 400 is selecting at least one additional random subset of time points (not shown) and the at least one additional random subset of time points being selected by altering a value of at least one time point in one of either the corresponding subset of time points or the optimal at least one subsequent subset of time points by a random incremental amount (not shown) within a predetermined maximum time increment value range (not shown). The force data of the force signatures in the two sets correspond with the at least one additional random subset of time points. The at least one additional random subset of time points includes the same number of time points from the plurality of time points as initial subset of time points 142 and the at least one subsequent subset of time points (not shown) and as the optimal subset of time points (not shown).

Another substep 408 in method 400 is producing a single Mahalanobis Distance (MD) value for each element in first and the second set 121, 125, respectively. The force data associated with each element in first and the second set 121, 125 at the at least one additional random subset of time points is input to the MD algorithm and the output of the MD algorithm being MD values produced for elements in the first set forming at least one additional random first MD value group and the MD values produced for elements in the second set forming at least one additional random second MD value group. The MD algorithm is used in a similar manner as in method 100, previously described herein, but is with force data associated with the at least one additional random subset of time points. The MD algorithm is configured, or set-up by creating a reference MD covariance matrix using the at least one additional random subset of time points as the variables. This is necessary for each at least one additional random subset of time points that is generated for the verification run. The need to define variables for the MD algorithm is known in the statistical arts.

A further step 412 in method 400 is evaluating a first spread of data of the at least one additional random first MD value group against a second spread of data of the at least one additional random second MD value group by the user to produce an at least one additional random second MD family group, and the at least one additional random first and the second MD value group forming an at least one additional random quality metric MD family group having a corresponding at least one additional random optimization metric value. The spread of the data is evaluated in a manner similar to that used in method 100 in the graphs of FIGS. 6 and 8 previously discussed herein.

Another step 414 in method 400 is defining at least one additional random quality threshold using the at least one additional random quality metric MD family group at said corresponding at least one subsequent subset of time points.

Another step 416 in method 400 is comparing at least one additional random optimization metric value with the optimal optimization metric value and any previous at least one additional random optimization metric value generated with the verification run to ensure that the optimal subset of time points is statistically robust or statistically non-robust. The optimal subset of time points are statistically robust if a largest and a smallest value of a combination of the optimal optimization metric value and all at least one additional random optimization metric values generated with the verification run are within a predetermined amount of each other. The optimal subset of time points are statistically non-robust if a largest and a smallest value of a combination of the optimal optimization metric value and all at least one additional random optimization metric values generated with the verification run are not within a predetermined amount of each other.

Another step 418 in method 400 is determining the optimal quality threshold established using the optimal subset of time points that are statistically robust. The optimal quality threshold and the optimal subset of time points are either the optimal quality threshold at the optimal subset of time points if the subset of time points is statistically robust, or the at least one additional random quality threshold using the at least one additional random subset of time points if the at least one additional random subset of time points is statistically robust. If the optimal subset of time points and the at least one additional random subset of time points are statistically non-robust, rerun the optimization run and re-verify the optimization run with a verification run.

The verification run may be utilized as much as required to obtain the optimal quality threshold established at the optimal subset of time points that are statistically robust. The predetermined amount is preferably measured in percent between the largest and smallest value. Preferably, the predetermined amount between the largest and smallest value may be 5% or less for the time points to be considered statistically robust. The predetermined amount provides a measure of how consistent the force signature produced by the press apparatus for a given core crimp portion element and is dependent on the variation that is found for a particular press apparatus set-up that includes a size of wire conductor, terminal, and press set-up, and the like. Alternately, the predetermined amount may be measured using the standard deviation, range, or variance, or other statistical measure of the force data.

Statistical robustness is defined where the optimization metric value does not change appreciably when the at least one additional random subset of time points are altered or deviated by a random incremental amount. The random incremental amount (not shown) may be defined within a predetermined maximum time increment value range to be 1-3 time point increments above or below a specific time point in either the subset of time points or the at least one subsequent subset of time points.

Any of the subset of time points including the initial subset of time points, the at least one subsequent subset of time points, the optimal subset of time points, the at least one additional random subset of time points each comprise the same number of time points selected from the plurality of time points. The initial subset of time points includes preferably at least ten (10) selected time points to accurately portray force signature curve 24. Alternately, each respective subset of time points may include the same number of time points but different from at least ten. Still yet alternately, each respective subset of time points may have a different number of time points from each other.

Figure 11:
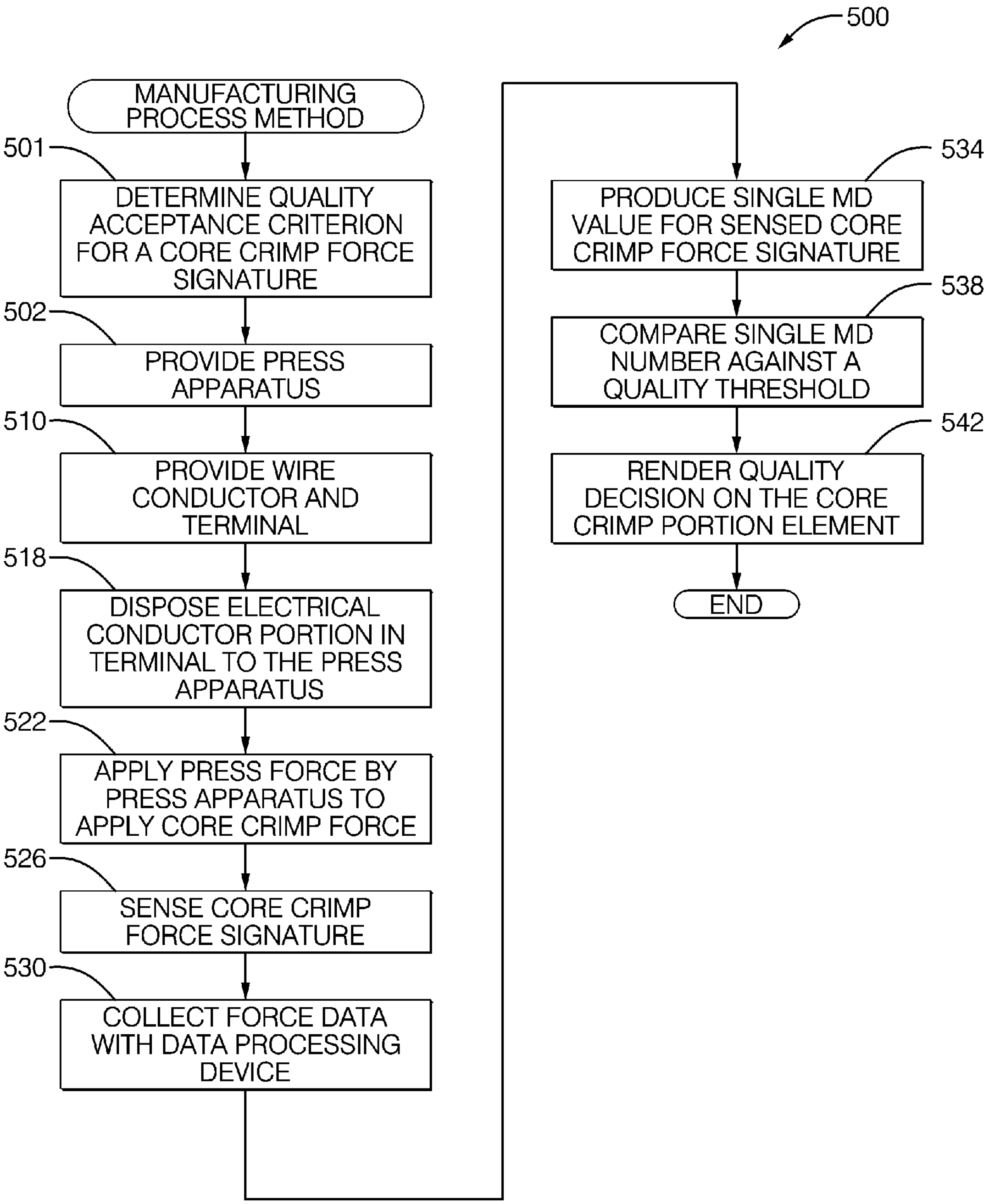
FIG. 11 is a flow chart of a manufacturing process method using the determined quality acceptance criterion according to the methods of FIGS. 3, 7, and 10.

In yet a further exemplary embodiment of the present invention, referring to FIG. 11, a manufacturing process method 500 for connecting wire conductor 12 to terminal 14 is presented.

One step 501 in method 500 is determining a quality acceptance criterion for core crimp force signature 24 on core crimp portion element 22. The quality acceptance criterion includes an optimal process quality threshold established using an optimal subset of time points. The optimal process quality threshold established using an optimal process subset of time points may include a first or a second or a third quality threshold. The first quality threshold is established using selected initial subset of time points 142. The second quality threshold may be established at initial subset of time points 142 with an optimization run. The second quality threshold may also be established at an at least one subsequent subset of time points different from initial subset of time points 142, and the at least one subsequent subset of time points is established with the optimization run. The third quality threshold may also be established at initial subset of time points 142 being established with a verification run to be statistically robust. The third quality threshold may also be established at the at least one subsequent subset of time points being different from initial subset of time points 142, and the at least one subsequent subset of time points being established with the verification run to be statistically robust. The third quality threshold may yet also be established at the at least one additional random subset of time points being different from subset of time points 142 and the at least one subsequent subset of time points, and the at least one additional random subset of time points being established with the verification run to be statistically robust. If either initial subset of time points 142 or the at least one subsequent subset of time points or the at least one additional random subset of time points established with the verification run are statistically non-robust, rerun the optimization run and re-verify the optimization run with the verification run.

Another step 502 in method 500 is providing press apparatus 115 including the data processing device being associated with press apparatus 115. The data processing device is in electrical connection with press apparatus 115 and may be secured to press apparatus 115 or be located remote from press apparatus 115.

Another step 510 in method 500 is providing wire conductor 12 and terminal 14. Wire conductor 12 includes inner electrical conductor portion 16 that contains a plurality of wire strands (not shown).

A further step 518 in method 500 is disposing electrical conductor portion 16 of wire conductor 12 in terminal 14 to press apparatus 115.

Another step 522 in method 500 is applying press force 10 by press apparatus 115. A portion of press force 10 is separately applied as core crimp force 20 to produce core crimp portion element 22 having core crimp force signature 24. Core crimp portion element 24 connects electrical conductor portion 16 of wire conductor 12 to terminal 14.

A further step 526 in method 500 is sensing the core crimp force signature 24 with the data processing device to capture the sensed core crimp force signature (not shown) in the memory (not shown) of the data processing device (not shown).

Another step 530 in method 500 is collecting force data from the sensed core crimp force signature (not shown) with the data processing device at least at the optimal process subset of time points within plurality of time points 124 in time range 126 of the core crimp force signature produced on the core crimp portion element.

A further step 534 in method 500 is producing a single MD value with an MD algorithm stored in the memory with the data processing device on the sensed core crimp force signature. The force data at the optimal process subset of time points disposed on the sensed core crimp force signature is input to the MD algorithm with the data processing device.

Another step 538 in method 500 is comparing the produced single MD value corresponding to the sensed core crimp force signature at the optimal process subset of time points against the optimal process quality threshold stored in the memory with the data processing device.

In yet a further step 542 in method 500 is rendering a quality decision on the core crimp portion element based on the step of comparing the produced single MD value, wherein the quality decision on the core crimp portion element is either acceptable quality, or a quality defect. Acceptable quality is where the produced single MD value is the same as or less than the optimal process quality threshold stored in the memory and the core crimp portion element has no missing wire strands from said plurality of wire strands in said electrical conductor portion disposed within said core crimp portion element. The core crimp portion element has a quality defect when the produced single MD value is greater than the optimal process quality threshold stored in the memory, and the quality defect of said core crimp portion element is at least one missing wire strand from the plurality of wire strands in the electrical conductor portion disposed within the core crimp portion element.

Referring to FIGS. 3, 7, 9 and 10 in accordance with yet another embodiment of the invention, a media includes computer-readable instructions for determining quality acceptance criterion for a force signature curve on a random element selected from a plurality of elements. The computer readable instructions are adaptable to configure a data processing device to carry out method 100 of determining a quality acceptance criterion for force signature curves, and discussed previously herein. The computer readable instructions may also be adaptable to also include the substeps to perform an optimization run according to flow diagram 200, and a verification run in flow diagram 300, and statistical analysis according to flow diagram 400. The details of method 100 of determining a quality acceptance criterion, of method 200 to perform an optimization run, of method 300 for determination of statistics to do statistical analysis, and method 400 to perform a verification run are previously described herein.

While not limited to any particular theory, it is believed that the selection of ten (10) time points from the plurality of time points to establish the initial subset of time points, the at least one subsequent subset of time points, the optimal subset of time points, and the at least one additional random subset of time points is effective to capture the essence of the force signature curve that allows the quality threshold to be defined and the quality of an element to be defined. Selecting less than ten time points from the plurality of time points may not allow the essence of the force signature curve to be captured such that the quality of an element may be discerned. Selecting greater than ten time points may allow discernment of the quality of the core crimp portion element but also may require additional time and cost to analyze and select the additional time points in one of the aforementioned subsets of time points.

While not limited to any particular theory, it is believed that at least fifteen (15) elements are needed to establish the first and second set of elements. Picking at least fifteen elements in each of the two sets is effective to provide the element variation necessary to populate the MD covariance matrix such that the operation of the MD covariance matrix captures normal manufacturing operation variation for a defined quality threshold useful to discern the quality of a element, and not so great as to not cause the quality of the element to not be discerned. Having more than fifteen elements in the two sets of elements may add additional cost and time to define the quality threshold.

The user of the method as described herein is not limited to any one individual, but rather is all encompassing to include any individual, group, firm, and the like that may be knowledgeable to provide the information needed to facilitate the operation of the methods of the present invention.

The statistical analysis step may use any method to understand the spread of the MD value data in the first group versus the MD value data in the second group. For example, one alternate method is to plot the MD values of the first and the second group and have a user view the data to understand the spread of the data. Another alternate approach is to analyze differences in other statistical measures such as the means of the force signature data, standard deviations of the force signature data, and the like.

Still yet alternately, the invention may be applied to wire having a single conductor core. Force signature analysis as described herein may be used to determine if a nick or crack is impinged on the conductor core. Force signature analysis may be used to determine if insulation or other debris is disposed in the core crimp portion element. Force signature analysis may also be employed to understand if a wire conductor has a necked-down condition where the wire is undersized in a certain portion of the wire conductor.

In another alternate embodiment, the insulation core crimp portion may be analyzed for missing wire strands, nicks or cracks in a solid conductor core, debris in the insulation crimp portion element, and the like.

In yet another alternate embodiment of the invention, force signature analysis may be used in metal forming operations such as crimping, stamping, blanking, and the like, where force signatures may be measured. The invention may also be used in insulation displacement applications where the wire is not stripped, but a contacting element is disposed through the insulation to make electrical contact with the electrical conductor wire. With insulation displacement, a force signature may be measured with the disposition of the element through the insulation and the quality of inherent connection discerned.

Thus, the invention provides a method to reliably determine a quality acceptance criterion for a force signature used to decrease quality defects in a core crimp portion element connecting a wire conductor to a terminal, especially for a size of wire conductor being less than 18 AWG. An initial quality threshold determined by using a selected initial subset of time points from a plurality of time points in a time range characterizing the force signature of the core crimp portion element may be further refined by establishing an optimal subset of time points with an optimization run. The optimal quality threshold established at the optimal set of time points increases the probability that using a quality threshold may better determine the quality of core crimp portion element having a force signature. A verification run may be performed on the optimal subset of time points to ensure statistical robustness of the optimal subset of time points. An optimal quality threshold established using an optimal subset of time points that is statistically robust provides an even greater probability that the quality of a core crimp portion element having a force signature may be determined. The use of statistical analysis using force difference values, or the standard deviations on the force data from the first and the second set allows for judicious selection of the subset of time points for use in the determination of the initial quality threshold.

While the present invention has been shown and described with reference to certain embodiments thereof, it will be understood by those skilled in the art that various changes in form and details may be made therein without departing from the spirit and scope of the present invention as defined by the appended claims.

All terms used in the claims are intended to be given their broadest ordinary meanings and their reasonable constructions as understood by those skilled in the art unless an explicit indication to the contrary is made herein. In particular, use of the singular articles such as "a," "the," "said," . . . et cetera, should be read to recite one or more of the indicated elements unless a claim recites an explicit limitation to the contrary.

We claim:

1. A method of determining a quality acceptance criterion for a force signature produced on an element, comprising:

providing a first set of elements having no quality defect and a second set of elements having a deliberate quality defect;

providing a press apparatus to generate a force to be applied to each element in each of the two sets to produce a force signature for each element in each of the two sets;

providing a Mahalanobis Distance (MD) algorithm disposed in a memory of a data processing device;

measuring the force signature having force data for each element in said first and said second set produced by the press apparatus, each force signature being measured at a plurality of time points over a time range so as to produce a respective first and a second family of force signatures for the first and the second set of elements;

statistically analyzing the respective first and the second family of force signatures to establish predetermined statistics on said force data on the measured force signatures in the respective first and the second families at each time point in the plurality of time points over the time range;

selecting an initial subset of time points from the plurality of time points based on the step of statistically analyzing the respective first and the second family of force signatures;

producing a single Mahalanobis Distance (MD) value for each element in the first and the second set, respectively, with the MD algorithm by inputting said force data associated with each element in the first and the second set at said initial subset of time points, the MD values produced for elements in the first set forming a first MD value group and the MD values produced for elements in the second set forming a second MD value group;

evaluating a first spread of the data of the first MD value group against a second spread of the data of the second MD value group, the first and the second MD value group forming an initial quality metric MD family group with a corresponding initial optimization metric value;

defining an initial quality threshold to be the quality acceptance criterion using the initial quality metric MD family group at said corresponding initial subset of time points, wherein an output of determining the quality acceptance criterion is using said defined initial quality threshold to separate said element having said force signature into one of, (i) a group of elements having no quality defect, and (ii) a group of elements having a quality defect like the deliberate quality defect.

2. The method according to claim 1, wherein the steps in the method are performed in the order recited.

3. The method according to claim 1, wherein the first and the second set comprise the same number of elements.

4. The method according to claim 3, wherein the first and the second set each comprise at least fifteen (15) elements.

5. The method according to claim 1, wherein the element comprises a core crimp portion element configured from a wire conductor disposed in a terminal to connect the wire conductor to the terminal, the wire conductor including an electrical conductor portion and an insulated wire portion including insulation surrounding the electrical conductor portion, and the electrical conductor portion including a plurality of wire strands, and a portion of the force applied by the press apparatus being a core crimp force being applied to the electrical conductor portion to form the core crimp portion element to connect the electrical conductor portion to the terminal, and the core crimp portion element having no quality defect when the electrical conductor portion disposed in the core crimp portion has no missing wire strand from the plurality of wire strands, and the core crimp portion element of the electrical conductor portion having a quality defect when the electrical conductor portion disposed in the core crimp portion element has at least one missing wire strand from the plurality of wire strands.

6. The method according to claim 5, wherein the wire conductor has a size being smaller than 18 AWG being connected with the associated terminal.

7. The method according to claim 1, wherein the step of statistically analyzing the respective first and the second family of force signatures further includes the predetermined statistics having the substeps of, determining at each time point in the plurality of time points over the time range a first average force and a first standard deviation for the first family of force signatures with the data processing device, determining at each time point in the time range a second average force and a second standard deviation for the second family of force signatures with the data processing device, determining at each time point in the plurality of time points over the time range a force average difference value with the data processing device, said force average difference value being the difference between the first average force and the second average force at each time point in the plurality of time points over the time range, and evaluating at least one of, (i) the force average difference value, (ii) the first standard deviation, and (iii) the second standard deviation, for the respective first and the second family of force signatures at each time point in the plurality of time points over the time range.

8. The method according to claim 1, wherein the step of defining the initial quality threshold further includes the initial quality threshold established using the initial subset of time points comprising an optimal quality threshold established using an optimal subset of time points determined by an optimization run, said optimization run including the substeps of, randomly selecting at least one subsequent subset of time points from the plurality of time points over the time range, producing a single Mahalanobis Distance (MD) value for each element in the first and the second set, respectively, with the MD algorithm by inputting said force data associated with each element in the first and the second set at the at least one subsequent subset of time points, the MD values produced for elements in the first set forming an at least one subsequent first MD value group and the MD values produced for elements in the second set forming an at least one subsequent second MD value group, evaluating a first spread of the data of the at least one subsequent first MD value group against a second spread of the data of the at least one subsequent second MD value group, the at least one subsequent first and the second MD value group forming an at least one subsequent quality metric MD family group with a corresponding at least one subsequent optimization metric value, comparing the at least one subsequent optimization metric value with the initial optimization metric value and any previous optimization metric values generated with the optimization run to determine an optimal optimization metric value to ensure that one of the initial subset of time points and the at least one subsequent subset of time points are an optimal subset of time points, defining at least one subsequent quality threshold using the at least one subsequent quality metric MD family group at said corresponding at least one subsequent subset of time points, and determining the optimal quality threshold established using the optimal subset of time points corresponding with the optimal optimization metric value, wherein the optimal quality threshold and said optimal subset of time points are one of, (i) said initial quality threshold using said initial subset of time points, and (ii) said at least one subsequent quality threshold using said at least one subsequent subset of time points.

9. The method according to claim 8, wherein the substep of determining the optimal quality threshold established using the optimal subset of time points further includes the substep of, performing a verification run to ensure statistical robustness for the optimal subset of time points, said verification run including the substeps of, selecting at least one additional random subset of time points, and the at least one additional random subset of time points being selected by altering at least one time point in the optimal subset of time points by a random incremental amount within a predetermined maximum time increment value range, and the force data of the force signatures in the two sets corresponding with the at least one additional random subset of time points, producing a single Mahalanobis Distance (MD) value for each element in the first and the second set, respectively, with the MD algorithm by inputting said force data associated with each element in the first and the second set at the at least one additional random subset of time points, the MD values produced for elements in the first set forming at least one additional random first MD value group and the MD values produced for elements in the second set forming at least one additional random second MD value group, evaluating a first spread of the data of the at least one additional random first MD value group against a second spread of the data of the at least one additional random second MD value group, the at least one additional random first MD value group and the at least one additional random second MD value group forming an at least one additional random quality metric MD family group with a corresponding at least one additional random optimization metric value, defining at least one additional random quality threshold using the at least one additional random quality metric MD family group at said corresponding at least one additional random subset of time points, comparing the at least one additional random optimization metric value with the optimal optimization metric value and any previous at least one additional random optimization metric value generated with the verification run to ensure that the optimal subset of time points is one of, (i) being statistically robust if a largest and a smallest value of a combination of the optimal optimization metric value and all at least one additional random optimization metric values generated with the verification run are within a predetermined amount of each other, and (ii) being statistically non-robust if a largest and a smallest value of a combination of the optimal optimization metric value and all at least one additional random optimization metric values generated with the verification run are not within a predetermined amount of each other, and determining the optimal quality threshold established using the optimal subset of time points that are statistically robust, wherein the optimal quality threshold established at said optimal subset of time points are one of, (i) the optimal quality threshold at the optimal subset of time points, wherein the optimal subset of time points is statistically robust, (ii) the at least one additional random quality threshold using said at least one additional random subset of time points and the at least one additional random subset of time points is statistically robust, and (iii) if the optimal subset of time points and the at least one additional random subset of time points are statistically non-robust, rerun the optimization run and re-verify the optimization run with the verification run.

10. The method according to claim 9, wherein the initial subset of time points, the at least one subsequent subset of time points, the optimal subset of time points, and the at least one additional random subset of time points each comprise the same number of time points selected from the plurality of time points.

11. A manufacturing process method for connecting a wire conductor to a terminal, comprising the steps of:

determining a quality acceptance criterion for a core crimp force signature on a core crimp portion element, said quality acceptance criterion including an optimal process quality threshold established using an optimal process set of time points, said optimal process quality threshold and said optimal process subset of time points are one of, (i) a first quality threshold established using a selected initial subset of time points, (ii) a second quality threshold established using one of, (a) the initial subset of time points and the initial subset of time points being established with an optimization run, and (b) an at least one subsequent subset of time points different from the initial subset of time points, said at least one subsequent subset of time points being established with the optimization run, and (iii) a third quality threshold established using one of, (a) the initial subset of time points being established with a verification run to be statistically robust, (b) the at least one subsequent subset of time points being different from the initial subset of time points, and the at least one subsequent subset of time points being established with the verification run to be statistically robust, (c) at least one additional random subset of time points being different from the initial subset of time points and the at least one subsequent subset of time points, and the at least one additional random subset of time points being established with the verification run to be statistically robust, and (d) if at least one of the initial subset of time points and the at least one subsequent subset of time points and the at least one additional random subset of time points established with the verification run are statistically non-robust, rerun the optimization run and re-verify the optimization run with the verification run, wherein said optimal process quality threshold established using said optimal process set of time points is stored in a memory of a data processing device;

providing a press apparatus including the data processing device being associated with said press apparatus;

providing said wire conductor and said terminal, said wire conductor includes an inner electrical conductor portion that contains a plurality of wire strands;

disposing said electrical conductor portion of said wire conductor in said terminal to said press apparatus;

applying a press force by said press apparatus, wherein a portion of said press force is separately applied as a core crimp force to produce said core crimp portion element having said core crimp force signature, said core crimp portion element connecting said electrical conductor portion of said wire conductor to said terminal;

sensing said core crimp force signature with said data processing device to capture said sensed core crimp force signature in said memory of said data processing device;

collecting force data from said sensed core crimp force signature with said data processing device at least at said optimal process subset of time points within a plurality of time points in a time range of the core crimp force signature produced on the core crimp portion element;

producing a single MD value as an output from a Mahalanobis Distance (MD) algorithm stored in said memory with said data processing device on said sensed core crimp force signature, and said force data at said optimal process subset of time points being disposed on said sensed core crimp force signature being input to said MD algorithm with said data processing device;

comparing said produced single MD value corresponding to said sensed core crimp force signature at said optimal process subset of time points against said optimal process quality threshold stored in the memory with said data processing device; and rendering a quality decision on said core crimp portion element based on said step of comparing said produced single MD value, wherein said rendered quality decision on said core crimp portion element is one of, (i) acceptable quality, wherein the produced single MD value is the same as or less than the optimal process quality threshold stored in the memory, wherein said acceptable quality of said core crimp portion element is having no missing wire strands from said plurality of wire strands in said electrical conductor portion disposed within said core crimp portion element, and (ii) a quality defect, wherein the produced single MD value is greater than the optimal process quality threshold stored in the memory, wherein said quality defect of said core crimp portion element is at least one missing wire strand from said plurality of wire strands in said electrical conductor portion disposed within said core crimp portion element.

12. The method according to claim 11, wherein the steps in the method are performed in the order recited.

13. The method according to claim 11, wherein the step of determining the quality acceptance criterion further includes a method for determining the quality acceptance criterion having the substeps of, providing a first set of elements having no quality defect and a second set of elements having a deliberate quality defect, providing the press apparatus to generate a force to be applied to each element in each of the two sets to produce a force signature for each element in each of the two sets, providing the Mahalanobis Distance (MD) algorithm disposed in the memory of the data processing device, measuring the force signature having force data for each element in said first and said second set produced by the press apparatus, each force signature being measured at a plurality of time points over a time range so as to produce a respective first and a second family of force signatures for the first and the second set of elements, statistically analyzing the respective first and the second family of force signatures to establish predetermined statistics on said force data on the measured force signatures in the respective first and the second families at each time point in the plurality of time points over the time range, selecting the initial subset of time points from the plurality of time points based on the step of statistically analyzing the respective first and the second family of force signatures, producing a single Mahalanobis Distance (MD) value for each element in the first and the second set, respectively, with the MD algorithm by inputting said force data associated with each element in the first and the second set at the initial subset of time points, the MD values produced for elements in the first set forming a first MD value group and the MD values produced for elements in the second set forming a second MD value group, evaluating a first spread of the data of the first MD value group against a second spread of the data of the second MD value group, the first and the second MD value group forming an initial quality metric MD family group with a corresponding initial optimization metric, and defining the initial quality threshold to be the quality acceptance criterion using the initial quality metric MD family group at the corresponding initial subset of time points, wherein an output of the quality acceptance criterion is using the defined quality threshold to separate the element having the force signature curve into one of, (i) elements having no quality defect, and (ii) a group of elements having a quality defect like the deliberate quality defect, and wherein the initial quality threshold comprises the first quality threshold.

14. The method according to claim 13, wherein the step of defining the initial quality threshold further includes the initial quality threshold established using the initial subset of time points comprising an optimal quality threshold established using an optimal subset of time points determined by the optimization run, said optimization run including the substeps of, randomly selecting the at least one subsequent subset of time points from the plurality of time points over the time range, producing a single Mahalanobis Distance (MD) value for each element in the first and the second set, respectively, with the MD algorithm by inputting said force data associated with each element in the first and the second set at the at least one subsequent subset of time points, the MD values produced for elements in the first set forming an at least one subsequent first MD value group and the MD values produced for elements in the second set forming an at least one subsequent second MD value group, evaluating a first spread of the data of the at least one subsequent first MD value group against a second spread of the data of the at least one subsequent second MD value group, the at least one subsequent first and the second MD value group forming an at least one subsequent quality metric MD family group with a corresponding at least one subsequent optimization metric value, comparing the at least one subsequent optimization metric value with the initial optimization metric value and any previous optimization metric values generated with the optimization run to determine an optimal optimization metric value to ensure that one of the initial subset of time points and the at least one subsequent subset of time points are an optimal subset of time points, defining at least one subsequent quality threshold using the at least one subsequent quality metric MD family group at said corresponding at least one subsequent subset of time points, and determining the optimal quality threshold established using the optimal subset of time points corresponding with the optimal optimization metric value, wherein the optimal quality threshold and said optimal subset of time points are one of, (i) said initial quality threshold using said initial subset of time points, and (ii) said at least one subsequent quality threshold using said at least one subsequent subset of time points, wherein said at least one subsequent quality threshold comprises the second quality threshold.

15. The method according to claim 14, wherein the substep of determining the optimal quality threshold established using the optimal subset of time points further includes the substep of, performing the verification run to ensure statistical robustness for the optimal subset of time points, said verification run including the substeps of, selecting at least one additional random subset of time points, and the at least one additional random subset of time points being selected by altering at least one time point in the optimal subset of time points by a random incremental amount within a predetermined maximum time increment value range, and the force data of the force signatures in the two sets corresponding with the at least one additional random subset of time points, producing a single Mahalanobis Distance (MD) value for each element in the first and the second set, respectively, with the MD algorithm by inputting said force data associated with each element in the first and the second set at the at least one additional random subset of time points, the MD values produced for elements in the first set forming at least one additional random first MD value group and the MD values produced for elements in the second set forming at least one additional random second MD value group, evaluating a first spread of the data of the at least one additional random first MD value group against a second spread of the data of the at least one additional random second MD value group, the at least one additional random first MD value group and the at least one additional random second MD value group forming an at least one additional random quality metric MD family group with a corresponding at least one additional random optimization metric value, defining at least one additional random quality threshold using the at least one additional random quality metric MD family group at said corresponding at least one additional random subset of time points, comparing the at least one additional random optimization metric value with the optimal optimization metric value and any previous at least one additional random optimization metric value generated with the verification run to ensure that the optimal subset of time points is one of, (i) being statistically robust if a largest and a smallest value of a combination of the optimal optimization metric value and all at least one additional random optimization metric values generated with the verification run are within a predetermined amount of each other, and (ii) being statistically non-robust if a largest and a smallest value of a combination of the optimal optimization metric value and all at least one additional random optimization metric values generated with the verification run are not within a predetermined amount of each other, and determining the optimal quality threshold established using the optimal subset of time points that are statistically robust, wherein the optimal quality threshold established at said optimal subset of time points are one of, (i) the optimal quality threshold at the optimal subset of time points, wherein the optimal subset of time points is statistically robust, (ii) the at least one additional random quality threshold using said at least one additional random subset of time points and the at least one additional random subset of time points is statistically robust, and (iii) if the optimal subset of time points and the at least one additional random subset of time points are statistically non-robust, rerun the optimization run and re-verify the optimization run with the verification run, and wherein the third quality threshold comprises the optimal quality threshold associated with the establishment of the optimal subset of time points that are statistically robust.

16. The method according to claim 13, wherein the step of statistically analyzing the respective first and the second family of force signatures further includes the predetermined statistics having the substeps of, determining at each time point in the plurality of time points over the predetermined time range a first average force and a first standard deviation for the first family of force signatures by the first data processing device, determining at each time point in the predetermined time range a second average force and a second standard deviation for the second family of force signatures by the first data processing device, determining at each time point in the plurality of time points over the predetermined time range a force average difference value by the first data processing device, said force average difference value being the difference between the first average force and the second average force at each time point in the plurality of time points over the predetermined time range, and evaluating by the user at least one of, (i) the force average difference value, (ii) the first standard deviation, and (iii) the second standard deviation, for the respective first and second family of force signatures at each time point in the plurality of time points over the predetermined time range.

17. The method according to claim 11, wherein the wire conductor has a size being smaller than 18 AWG connected with the associated terminal.

18. A media including a non-transitory computer-readable instructions for determining quality acceptance criterion for a force signature on an element, said computer-readable instructions being adapted to configure a data processing device to carry out a method, the method comprising:

providing a first set of elements having no quality defect and a second set of elements having a deliberate quality defect;

providing a press apparatus to generate a force to be applied to each element in each of the two sets to produce a force signature for each element in each of the two sets;

providing a Mahalanobis Distance (MD) algorithm disposed in a memory of a data processing device;

measuring the force signature having force data for each element in said first and said second set produced by the press apparatus, each force signature being measured at a plurality of time points over a time range so as to produce a respective first and a second family of force signatures for the first and the second set of elements;

statistically analyzing the respective first and the second family of force signatures to establish predetermined statistics on said force data on the measured force signatures in the respective first and the second families at each time point in the plurality of time points over the time range;

selecting an initial subset of time points from the plurality of time points based on the step of statistically analyzing the respective first and the second family of force signatures;

producing a single Mahalanobis Distance (MD) value for each element in the first and the second set, respectively, with the MD algorithm by inputting said force data associated with each element in the first and the second set at said initial subset of time points, the MD values produced for elements in the first set forming a first MD value group and the MD values produced for elements in the second set forming a second MD value group;

evaluating a first spread of the data of the first MD value group against a second spread of the data of the second MD value group, the first and the second MD value group forming an initial quality metric MD family group with a corresponding initial optimization metric; and defining an initial quality threshold to be the quality acceptance criterion using the initial quality metric MD family group at said corresponding initial subset of time points, wherein an output of determining the quality acceptance criterion is using said defined quality threshold to separate said element having said force signature into one of, (i) a group of elements having no quality defect, and (ii) a group of elements having a quality defect like the deliberate quality defect.

19. The media according to claim 18, wherein the step of defining the initial quality threshold further includes the initial quality threshold established using the initial subset of time points comprising an optimal quality threshold established using an optimal subset of time points determined by an optimization run, said optimization run including the substeps of, randomly selecting at least one subsequent subset of time points from the plurality of time points over the time range, producing a single Mahalanobis Distance (MD) value for each element in the first and the second set, respectively, with the MD algorithm by inputting said force data associated with each element in the first and the second set at the at least one subsequent subset of time points, the MD values produced for elements in the first set forming an at least one subsequent first MD value group and the MD values produced for elements in the second set forming an at least one subsequent second MD value group, evaluating a first spread of the data of the at least one subsequent first MD value group against a second spread of the data of the at least one subsequent second MD value group, the at least one subsequent first and the second MD value group forming an at least one subsequent quality metric MD family group with a corresponding at least one subsequent optimization metric value, comparing the at least one subsequent optimization metric value with the initial optimization metric value and any previous optimization metric values generated with the optimization run to determine an optimal optimization metric value to ensure that one of the initial subset of time points and the at least one subsequent subset of time points are an optimal subset of time points, defining at least one subsequent quality threshold using the at least one subsequent quality metric MD family group at said corresponding at least one subsequent subset of time points, and determining the optimal quality threshold established using the optimal subset of time points corresponding with the optimal optimization metric value, wherein the optimal quality threshold and said optimal subset of time points are one of, (i) said initial quality threshold using said initial subset of time points, and (ii) said at least one subsequent quality threshold using said at least one subsequent subset of time points.

20. The media according to claim 19, wherein the substep of determining the optimal quality threshold established using the optimal subset of time points further includes the substep of, performing a verification run to ensure statistical robustness for the optimal subset of time points, said verification run including the substeps of, selecting at least one additional random subset of time points, and the at least one additional random subset of time points being selected by altering at least one time point in the optimal subset of time points by a random incremental amount within a predetermined maximum time increment value range, and the force data of the force signatures in the two sets corresponding with the at least one additional random subset of time points, producing a single Mahalanobis Distance (MD) value for each element in the first and the second set, respectively, with the MD algorithm by inputting said force data associated with each element in the first and the second set at the at least one additional random subset of time points, the MD values produced for elements in the first set forming at least one additional random first MD value group and the MD values produced for elements in the second set forming at least one additional random second MD value group, evaluating a first spread of the data of the at least one additional random first MD value group against a second spread of the data of the at least one additional random second MD value group, the at least one additional random first MD value group and the at least one additional random second MD value group forming an at least one additional random quality metric MD family group with a corresponding at least one additional random optimization metric value, defining at least one additional random quality threshold using the at least one additional random quality metric MD family group at said corresponding at least one additional random subset of time points, comparing the at least one additional random optimization metric value with the optimal optimization metric value and any previous at least one additional random optimization metric value generated with the verification run to ensure that the optimal subset of time points is one of, (i) being statistically robust if a largest and a smallest value of a combination of the optimal optimization metric value and all at least one additional random optimization metric values generated with the verification run are within a predetermined amount of each other, and (ii) being statistically non-robust if a largest and a smallest value of a combination of the optimal optimization metric value and all at least one additional random optimization metric values generated with the verification run are not within a predetermined amount of each other, and determining the optimal quality threshold established using the optimal subset of time points that are statistically robust, wherein the optimal quality threshold established at said optimal subset of time points are one of, (i) the optimal quality threshold at the optimal subset of time points, wherein the optimal subset of time points is statistically robust, (ii) the at least one additional random quality threshold using said at least one additional random subset of time points and the at least one additional random subset of time points is statistically robust, and (iii) if the optimal subset of time points and the at least one additional random subset of time points are statistically non-robust, rerun the optimization run and re-verify the optimization run with the verification run.

21. The media according to claim 18, wherein the step of statistically analyzing the respective first and the second family of force signatures further includes the predetermined statistics having the substeps of, determining at each time point in the plurality of time points over the time range a first average force and a first standard deviation for the first family of force signatures with the data processing device, determining at each time point in the time range a second average force and a second standard deviation for the second family of force signatures with the data processing device, determining at each time point in the plurality of time points over the time range a force average difference value with the data processing device, said force average difference value being the difference between the first average force and the second average force at each time point in the plurality of time points over the time range, and evaluating at least one of, (i) the force average difference value, (ii) the first standard deviation, and (iii) the second standard deviation, for the respective first and the second family of force signatures at each time point in the plurality of time points over the time range.

22. The media according to claim 18, wherein the element is a core crimp portion element formed from an applied core crimp force, said core crimp portion element including an electrical conductor portion of a wire conductor being disposed in a terminal, and the core crimp portion element being configured to electrically and mechanically connect the electrical conductor portion with the terminal after the application of the applied core crimp force, and the wire conductor having a size being smaller than 18 AWG connected with the associated terminal.

* * * * *